United States Patent
Uemura

(10) Patent No.: US 8,611,377 B2
(45) Date of Patent: Dec. 17, 2013

(54) MOBILE COMMUNICATION SYSTEM, MOBILE STATION DEVICE, BASE STATION DEVICE, AND MOBILE COMMUNICATION METHOD HAVING IMPROVED COMMUNICATION QUALITY DURING SYNCHRONIZATION LOSS

(75) Inventor: Katsunari Uemura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 998 days.

(21) Appl. No.: 12/530,980

(22) PCT Filed: Mar. 12, 2008

(86) PCT No.: PCT/JP2008/054470
§ 371 (c)(1),
(2), (4) Date: Sep. 11, 2009

(87) PCT Pub. No.: WO2008/111606
PCT Pub. Date: Sep. 18, 2008

(65) Prior Publication Data
US 2010/0098051 A1 Apr. 22, 2010

(30) Foreign Application Priority Data
Mar. 13, 2007 (JP) .................................. 2007-063728

(51) Int. Cl.
*H04J 3/06* (2006.01)
(52) U.S. Cl.
USPC ........... 370/503; 370/329; 370/333; 370/350; 455/450; 455/502
(58) Field of Classification Search
None
See application file for complete search history.

(56) References Cited

U.S. PATENT DOCUMENTS 5,889,759 A * 3/1999 McGibney ................... 370/207

6,456,826 B1 9/2002 Toskala et al.
2008/0045228 A1 * 2/2008 Zhang et al. .................. 455/450

FOREIGN PATENT DOCUMENTS

JP 2003-524987 A 8/2003
WO WO-01/63794 A2 8/2001

OTHER PUBLICATIONS

3GPP TS 25.101 V7.5.0 3rd Generation Partnership Project; Technical Specification Group Radio Access Network; User Equipment (UE) radio transmission and reception (FDD) (Release 7), pp. 19-22, [online], Oct. 5, 2006, [retrieved on Mar. 28, 2008]. Retrieved from the Internet: <URL:http://www.3gpp.org/ftp/Specs/archive/25_series/25.101/25101-750.zip>.

Ericsson, Downlink out-of-sync, TSG-RAN Working Group 1 meeting #10, Beijing, China, Jan. 18-21, 2000 [online], Jan. 21, 2000, [retrieved on Mar. 28, 2008]. Retrieved from the Internet: URL:http://www.3gpp.org/ftp/tsg_ran/WG1_RL1/TSGR1_10/Docs/Zips/R1-00-0103.zip>.

(Continued)

*Primary Examiner* — Ian N Moore
*Assistant Examiner* — Jackie Zuniga
(74) *Attorney, Agent, or Firm* — Birch, Stewart, Kolasch & Birch, LLP

(57) ABSTRACT

A mobile station device that communicates with a base station device, including: a downlink synchronization error detecting portion that detects the occurrence of a downlink synchronization error from the measurement result of a transmission signal of the base station device; a synchronization monitoring portion that sets information showing the occurrence of a downlink synchronization error into a random access channel based on the downlink synchronization state or both the downlink and uplink synchronization states of the mobile station device; and a downlink synchronization error notifying portion that transmits the random access channel to the base station device.

15 Claims, 24 Drawing Sheets

(56) References Cited

OTHER PUBLICATIONS

3GPP TSG-RAN WG2 #57, "R2-070566", St. Lous, Missouri, U.S.A, Feb. 12-16, 2007.
3GPP TSG-RAN WG2 #55, "R2-062952", Seoul, south Korea, Oct. 9-13, 2006.
3GPP TSG-RAN2 Meeting #57, "R2-070808", Stl Louis, U.S.A., Feb. 12-16, 2007.
3GPP TS 36.300 V0.4.0 (Jan. 2007), p. 43-44.
3GPP TR 25.814 V1.5.0 (May 2006), 3rd Generation Partnership Project; Technical Specification Group Radio Access Network; Physical Layer Aspects for Evolved UTRA (Release 7).

* cited by examiner

MOBILE COMMUNICATION SYSTEM, MOBILE STATION DEVICE, BASE STATION DEVICE, AND MOBILE COMMUNICATION METHOD HAVING IMPROVED COMMUNICATION QUALITY DURING SYNCHRONIZATION LOSS

TECHNICAL FIELD

The present invention relates to a mobile communication system, a mobile station device, a base station device, and a mobile communication method.

Priority is claimed on Japanese Patent Application No. 2007-063728, filed Mar. 13, 2007, the content of which is incorporated herein by reference.

BACKGROUND ART

Currently, by introducing a portion of technology that had been considered for fourth generation systems to the third generation frequency band, the EUTRA (Evolved Universal Terrestrial Radio Access) that aims for an improvement of transmission speed is being studied by the standards group 3GPP (3rd Generation Partnership Project) (refer to Non-Patent Document 1 and Non-Patent Document 2).

The adoption of the OFDMA (Orthogonal Frequency Division Multiplexing Access) system that as a transmission method is resistant to multi-pass interference and suitable for high-speed transmission has been decided in EUTRA. Also, in the detailed specifications relating to upper layer operation such as the data transfer control and resource management control of EUTRA, low delay and low overhead have been achieved, and moreover adoption of the simplest possible technology is being advanced (Non-Patent Document 2).

Regarding the control system when downlink synchronization loss is detected in the lower layer among the control of the upper layer in EUTRA, a control method that is approximately the same as W-CDMA (Wideband-Code Division Multiple Access) that was adopted in the third generation mobile radio access network UTRAN (Universal Terrestrial Radio Access Network) is being considered (refer to Section 10.1.6 in Non-Patent Document 2). In the W-CDMA method, in a mobile station device that detects downlink synchronization loss, control that stops uplink data is necessary (refer to section 6.4.4 of Non-Patent Document 3). The information that a mobile station device transmits to a base station device due to a radio resource request or closed loop control by the abovementioned control (for example, quality information index or packet resending control information, and electric power control information) is, when downlink synchronization is lost, not notified to the base station device, and so closed loop control is not achieved, and there is the possibility of wasting radio resources power consumption. For that reason, many methods that do not cause downlink synchronization loss in W-CDMA have been proposed (Patent Document 1).

FIG. 20 is a figure for explaining the process of transmission of a mobile station device to the base station device (FIG. 20 (a)), and subsequent reception in the conventional technology (FIG. 20 (b)). The mobile station device judges the downlink synchronization state using any of the downlink channels during reception.

FIG. 20 shows the state transition of the uplink channel and the downlink channel in the case of transitioning to the idle state (the state in which the mobile station device and the base station device are not wirelessly connected) after detection of a downlink channel error and both recovery of downlink synchronization and reconnection not being possible. Here, in the case of a downlink synchronization error being detected in the downlink channel, since the mobile station device judges whether or not the downlink synchronization error is temporary, the downlink channel state is made to transition from the synchronized interval P11 to the error detection interval P12.

Moreover, in the case of a downlink synchronization error being continuously detected even in the error detection interval P12, and downlink synchronization errors of a definite number of times being detected, next a transition is made to the synchronization protection interval P13 that attempts to recover the downlink synchronization state and simultaneously starts a timer that times the synchronization protection interval P13.

At this time, the mobile station device stops transmission of the signal using the uplink channel from a mobile station device to the base station device. This interval is called the data signal transmission stop interval 21. Even if the synchronization of the downlink channel has not recovered by the time of measurement by the timer having expired, it makes the judgment of having reached downlink synchronization loss, and the mobile station device transitions to a reconnection interval P14 attempts reconnection, and simultaneously starts a timer that times the reconnection interval P14. In the reconnection interval P14, the mobile station device repeatedly performs the cell reselection procedure that selects a cell of good quality. The mobile station device that chose a good cell with the cell reselection procedure performs a reconnection request to the aforementioned cell using an asynchronous random access channel. When permission to the reconnection request is not issued from the base station device until the timing by the timer expires, the mobile station device judges that reconnection as having failed and releases the radio resources, and transitions to an idle state interval P15 in which radio connection is not performed to the base station device.

FIG. 21 is a figure for explaining the process of the transmission of a mobile station device to a base station device (FIG. 21 (a)), and subsequent reception (FIG. 21 (b)) in the conventional technology. FIG. 21 shows the state transition of the uplink channel and the downlink channel in the case of, following a downlink synchronization error detection in the downlink channel, the downlink synchronization having recovered before downlink synchronization loss. It is the same as FIG. 20 up until the state of the downlink channel transitioning to the synchronization protection interval P13, and the uplink channel state becoming the uplink channel stop interval P21.

Here, in the case of the synchronization of the downlink channel having recovered before the timing by the abovementioned timer having expired, the mobile station device transitions the downlink channel state to the synchronous interval P16, and resumes transmission of the uplink data channel to return to the normal state.

FIG. 22 is a figure for explaining the process of the transmission of a mobile station device to a base station device (FIG. 22 (a)) and the subsequent reception (FIG. 22 (b)) in the conventional technology.

FIG. 22 shows the state transition of the uplink channel and the downlink channel in the case of, following a downlink synchronization error detection in the downlink channel, reconnection being made. It is the same as FIG. 20 up until performing a reconnection request to the base station device of the cell selected by the cell reselection procedure, after downlink synchronization loss occurs. Here, when a reconnection permission is issued from the base station device prior to the timing by the timer expiring, the downlink channel state is transitioned to the synchronization establishment interval P17 that attempts synchronization with the selected cell, and after synchronization is achieved, the downlink channel state is transitioned to synchronization interval P16, and simultaneously the transmission of the uplink data channel that had been stopped is resumed to return to the normal state.

FIG. 23 is a sequence diagram that shows the process of a mobile communication system in the conventional technology. FIG. 23 shows an example of the adjustment method of the uplink transmission timing when the state of the uplink channel of a mobile station device in EUTRA is uplink asynchronous. Since the mobile station device has not achieved uplink synchronization, it is transmitting preamble data by an asynchronous random access channel, and so the uplink transmission timing is adjusted from the base station device. The base station device receives a signal transmitted by the asynchronous random access channel from the mobile station device (Step S11), and measures the timing discrepancy between the reception timing and subframe lead position of the base station device (Step S12). The timing discrepancy is notified to a mobile station device as uplink timing adjustment control data (Step S13). Even if the downlink channel that issues the uplink timing adjustment control data is a downlink data channel, it may be a downlink common control channel.

A mobile station device adjusts the uplink transmission timing according to the issued uplink timing adjustment control data (Step S14), and uses it as uplink transmission timing of subsequent uplink data (Step S15).

FIG. 24 is a sequence diagram that shows the process of a mobile communication system in the conventional technology. FIG. 24 shows another example of the adjustment method of the uplink transmission timing when the state of the uplink channel of a mobile station device in EUTRA is in synchronization. The base station device receives the uplink data that is transmitted at least once within a predetermined cycle from a mobile station device (Steps S21, S25), and measures the timing discrepancy between the reception timing and the subframe lead position of the base station device (Steps S22, S26). The timing discrepancy is notified to the mobile station device at least once within a predetermined cycle as uplink timing adjustment control data (Steps S23, S27).

The base station device uses data of any uplink channel as uplink data transmitted from the above-mentioned mobile station device that is used in order to measure the timing discrepancy.

A mobile station device adjusts the uplink transmission timing according to the uplink timing adjustment control data that has been issued (Steps S24, S28), and uses it as uplink transmission timing of subsequent uplink data. Here, when the time during which uplink synchronization between the base station device and the mobile station device can be continued, that is, the time that guarantees that uplink synchronization is maintained assuming a normal transmission state, serves as the uplink synchronization adjustment cycle, the uplink timing adjustment control data must be transmitted to the mobile station device one within the uplink synchronization adjustment cycle. Also, the uplink data must be transmitted to the base station device one within the uplink synchronization adjustment cycle. When the uplink data is not transmitted even once within the uplink synchronization adjustment cycle due to intermittent reception or the like, the uplink synchronization state is judged to be asynchronous.

FIG. 25 is a sequence diagram that shows the process of a mobile communication system in the conventional technology. FIG. 25 shows the transition of the downlink synchronization state in both of the mobile station device and the base station device during the occurrence of downlink synchronization loss and related radio controls. The process of FIG. 25 starts from the state of the synchronization intervals P11, P31 in which the mobile station device and the base station device perform mutual communication.

Due to reasons of quality degradation of the downlink channel, the downlink synchronization state of the mobile station device side transitions to the error detection interval P12, and moreover when the error detection interval P12 ends as is without the downlink synchronization recovering, the downlink synchronization state of the mobile station device side transitions to the synchronization protection interval P13, and the transmission portion of the mobile station device performs uplink transmission stop control as a result of being notified of the transition to the synchronization protection interval P13 (Step S32).

Furthermore, even if the synchronization protection interval P13 ends, when the downlink synchronization does not recover, the downlink synchronization state of the mobile station device side transitions to the reconnection interval P14, and in the radio portion of the mobile station device, by the detection of downlink synchronization loss being notified (Step S33), cell reselection control is started (Step S34). In the event of a suitable cell being detected by the cell reselection control, the occurrence of cell reselection is notified to the base station device using a random access channel (Steps S35, S36). The base station device first causes the synchronization state of the base station device to transition from the synchronization interval P31 to the reconnection interval P32 upon receiving a signal of the random access channel, and performs downlink transmission stop control (Steps S37, S38).

Patent Document 1: PCT (WO) 2003-524987

Non-Patent Document 1: 3GPP TR (Technical Report) 25.814, V1.5.0 (2006-5), "Physical Layer Aspects for Evolved UTRA". [URL: http://www.3gpp.org/ftp/Specs/html-info/25814.htm]

Non-Patent Document 2: 3GPP TS (Technical Specification) 36.300,V0.4.0 (2007-1), "Overall description; Stage2". [URL: http://www.3gpp.org/ftp/Specs/html-info/36300.htm]

Non-Patent Document 3: 3GPP TS (Technical Specification) 25.101,V7.5.0 (2006-9), "User Equipment (UE) radio transmission and reception (FDD)". [URL: http://www.3gpp.org/ftp/Specs/html-info/25101.htm]

However, in the conventional technology, as shown in FIG. 25, in the interval until informing the occurrence of a cell reselection to the base station device after the mobile station device transitions to the error detection interval P12, a disagreement in the downlink synchronization state of the mobile station device and the base station device occurs. For that reason, the disagreement interval of this downlink synchronization state is scheduled, and so there is a possibility that the downlink data that is transmitted from the base station device to the mobile station device will not be received, giving rise to the problems of the radio resources being wastefully consumed and the radio utilization efficiency falling.

When a downlink synchronization error occurs in a mobile station device in connection with this, there has been the problem of time being required until being able to perform communication in a state of the communication quality being good between the base station device and the mobile station device.

The present invention was achieved in view of the above circumstances, and has as its object to provide a mobile communication system, a mobile station device, a base station device, and a mobile communication method that are capable of performing communication in a state of the communication quality being good between the base station device and the mobile station device even in the case of a downlink synchronization error occurring at the mobile station device.

DISCLOSURE OF INVENTION (1) The present invention was achieved to solve the aforementioned issues, and a mobile communication system in accordance with one aspect of the present invention is a mobile communication system provided with a mobile station device and a base station device, the mobile station device being provided with of a downlink synchronization error detecting portion that detects the occurrence of a downlink synchronization error from the measurement result of a transmission signal of the base station device; a synchronization monitoring portion that sets information showing the occurrence of a downlink synchronization error into a random access channel based on the downlink synchronization state or both the downlink and uplink synchronization states of the mobile station device; and a downlink synchronization error notifying portion that transmits the random access channel to the base station device, and the base station device being provided with of an adaptive control portion that receives a random access channel from the mobile station device, executes acquisition processing of control information that is set into the random access channel and that shows the occurrence of a downlink synchronization error, and performs scheduling based on the information that shows the occurrence of the downlink synchronization error.

(2) Also, the mobile station device of the mobile communication system in accordance with one aspect of the present invention sets information showing the occurrence of a downlink synchronization error with respect to the base station device into a random access channel if the downlink synchronization state of the mobile station device is a state in which the occurrence of a downlink synchronization error has been detected at least once.

(3) Also, the mobile station device of the mobile communication system in accordance with one aspect of the present invention sets information showing the occurrence of a downlink synchronization error with respect to the base station device into a random access channel if the downlink synchronization state of the mobile station device is a state in which the occurrence of a downlink synchronization error has been continuously detected a predetermined number of times or for a predetermined time.

(4) Also, the mobile station device of the mobile communication system in accordance with one aspect of the present invention sets information that shows the occurrence of a downlink synchronization error with respect to the base station device into a random access channel if the uplink synchronization state of the mobile station device is a state within a predetermined time after receiving uplink timing adjustment control data that shows the uplink transmission timing, and furthermore the downlink synchronization state of the mobile station device is a state in which a downlink synchronization error has been detected at least once.

(5) Also, the mobile station device of the mobile communication system in accordance with one aspect of the present invention, after notifying the base station device of the occurrence of a downlink synchronization error, repeatedly transmits the occurrence of a downlink synchronization error using a random access channel to the base station device each time a predetermined time has elapsed.

(6) Also, the base station device of the mobile communication system in accordance with one aspect of the present invention starts a timer that measures the time until downlink synchronization loss simultaneously with being notified of the occurrence of a downlink synchronization error from the mobile station device, and during a period until the timer expires or until the downlink synchronization error recovers, performs scheduling to use a modulation method with a higher error correction capability than prior to notification of the downlink synchronization error on a transmission signal to the mobile station device, or increase the transmission power.

(7) Also, the base station device of the mobile communication system in accordance with one aspect of the present invention starts a timer that measures the time until downlink synchronization loss simultaneously with being notified of a downlink synchronization error by the mobile station device, and when the timer has expired, performs scheduling to stop subsequent transmission to the mobile station device.

(8) Also, the mobile station device in accordance with one aspect of the present invention is a mobile station device that communicates with a base station device, provided with a downlink synchronization error detecting portion that detects the occurrence of a downlink synchronization error from the measurement result of a transmission signal of the base station device; a synchronization monitoring portion that sets information showing the occurrence of a downlink synchronization error into a random access channel based on the downlink synchronization state or both the downlink and uplink synchronization states of the mobile station device; and a downlink synchronization error notifying portion that transmits the random access channel to the base station device.

(9) Also, the synchronization monitoring portion of the mobile station device in accordance with one aspect of the present invention sets information showing the occurrence of a downlink synchronization error into a random access channel if the downlink synchronization state of the mobile station device is a state in which the occurrence of a downlink synchronization error has been detected at least once.

(10) Also, the synchronization monitoring portion of the mobile station device in accordance with one aspect of the present invention sets information showing the occurrence of a downlink synchronization error into a random access channel if the downlink synchronization state of the mobile station device is a state in which the occurrence of a downlink synchronization error has been continuously detected a predetermined number of times or for a predetermined time.

(11) Also, the synchronization monitoring portion of the mobile station device in accordance with one aspect of the present invention sets information showing the occurrence of a downlink synchronization error into a random access channel if the uplink synchronization state of the mobile station device is a state within a predetermined time after receiving uplink timing adjustment control data that shows the uplink transmission timing, and furthermore the downlink synchronization state of the mobile station device is a state in which a downlink synchronization error has been detected at least once.

(12) Also, the downlink synchronization error notifying portion of the mobile station device in accordance with one aspect of the present invention, after notifying the base station device of the occurrence of a downlink synchronization error, repeatedly notifies the occurrence of a downlink synchronization error using a random access channel to the base station device each time a predetermined time has elapsed.

(13) Also, a base station device in accordance with one aspect of the present invention is a base station device that communicates with a mobile station device, provided with an adaptive control portion that starts a timer that measures the time until downlink synchronization loss simultaneously with being notified of the occurrence of a downlink synchronization error from the mobile station device, and during a period until the timer expires or until the downlink synchronization error recovers, performs scheduling based on information that shows the occurrence of the downlink synchronization error.

(14) Also, the adaptive control portion of the base station device in accordance with one aspect of the present invention performs scheduling to use a modulation method with a higher error correction capability than prior to notification of the downlink synchronization error on a transmission signal to the mobile station device, or increase the transmission power.

(15) Also, the adaptive control portion of the base station device in accordance with one aspect of the present invention starts a timer that measures the time until downlink synchronization loss simultaneously with being notified of the occurrence of a downlink synchronization error from the mobile station device, and when the timer has expired, performs scheduling to stop subsequent transmission to the mobile station device.

(16) A mobile communication method in accordance with one aspect of the present invention is a mobile communication method that uses a mobile station device and a base station device, the mobile station device having a downlink synchronization error detecting process that detects the occurrence of a downlink synchronization error from the measurement result of a transmission signal of the base station device; a synchronization monitoring process that sets information showing the occurrence of a downlink synchronization error into a random access channel based on the downlink synchronization state or both the downlink and uplink synchronization states of the mobile station device; and a downlink synchronization error notifying process that transmits the random access channel to the base station device, and the base station device having an adaptive control process that receives a random access channel from the mobile station device, executes acquisition processing of control information that is set into the random access channel and that shows the occurrence of a downlink synchronization error, and performs scheduling based on the information that shows the occurrence of the downlink synchronization error.

(17) Also, in the synchronization monitoring process of the mobile communication method in accordance with one aspect of the present invention, setting information showing the occurrence of a downlink synchronization error with respect to the base station device into a random access channel if the downlink synchronization state of the mobile station device is a state in which the occurrence of a downlink synchronization error has been detected at least once.

(18) Also, in the synchronization monitoring process of the mobile communication method in accordance with one aspect of the present invention, setting information showing the occurrence of a downlink synchronization error with respect to the base station device into a random access channel if the downlink synchronization state of the mobile station device is a state in which the occurrence of a downlink synchronization error has been continuously detected a predetermined number of times or for a predetermined time.

(19) Also, in the synchronization monitoring process of the mobile communication method in accordance with one aspect of the present invention, setting information that shows the occurrence of a downlink synchronization error with respect to the base station device into a random access channel if the uplink synchronization state of the mobile station device is a state within a predetermined time after receiving uplink timing adjustment control data that shows the uplink transmission timing, and furthermore the downlink synchronization state of the mobile station device is a state in which a downlink synchronization error has been detected at least once.

(20) Also, in the downlink synchronization error notifying process of the mobile communication method in accordance with one aspect of the present invention, after notifying the base station device of the occurrence of a downlink synchronization error, repeatedly transmitting the occurrence of a downlink synchronization error using a random access channel to the base station device each time a predetermined time has elapsed.

(21) Also, in the adaptive control process of the mobile communication method in accordance with one aspect of the present invention, starting a timer that measures the time until downlink synchronization loss simultaneously with being notified of the occurrence of a downlink synchronization error from the mobile station device, and during a period until the timer expires or until the downlink synchronization error recovers, performing scheduling to use a modulation method with a higher error correction capability than prior to notification of the downlink synchronization error on a transmission signal to the mobile station device, or increase the transmission power.

(22) Also, in the adaptive control process of the mobile communication method in accordance with one aspect of the present invention, starting a timer that measures the time until downlink synchronization loss simultaneously with being notified of the occurrence of a downlink synchronization error by the mobile station device, and when the timer has expired, performing scheduling to stop subsequent transmission to the mobile station device.

EFFECT OF THE INVENTION

In the mobile communication system, the mobile station device, the base station device, and the mobile communication method of the present invention, even if a downlink synchronization error occurs at the mobile station device, it is possible to promptly perform communication with the communication quality in a good state between the base station device and the mobile station device.

| Reference Symbols | |
|---|---|
| 10a to 10c | mobile station device |
| 11a to 11c | reception portion |
| 12a to 12c | timing tracking portion |
| 13a to 13b | channel demodulation portion |
| 14a to 14c | scheduling portion |
| 15a to 15c | control signal processing portion |
| 16a to 16c | decoding portion |
| 17a to 17c | channel measuring portion |
| 18a to 18c | timing adjusting portion |
| 19a to 19c | CQI calculation portion |
| 20a to 20c | upper layer |
| 21a to 21c | synchronization monitoring portion |
| 22a to 22c | encoding portion |
| 23a to 23c | random access control portion |
| 24a to 24c | channel modulation portion |
| 25a to 25c | transmission power control portion |
| 26a to 26c | transmission portion |
| 27a to 27c | downlink synchronization error detection portion |
| 30a to 30c | base station device |
| 31a to 31c | reception portion |
| 32a to 32c | timing tracking portion |
| 33a to 33c | channel demodulation portion |
| 34a to 34c | scheduling portion |
| 35a to 35c | control signal processing portion |
| 36a to 36c | decoding portion |
| 37a to 37c | channel measuring portion |
| 38a to 38c | uplink synchronization adjustment request portion |
| 39a to 39c | CQI calculation portion |
| 40a to 40c | upper layer |
| 41a to 41c | encoding portion |
| 42a to 42c | channel modulation portion |
| 43a to 43c | transmission power control portion |
| 44a to 44c | transmission portion |

BEST MODE FOR CARRYING OUT THE INVENTION

Figure 1:
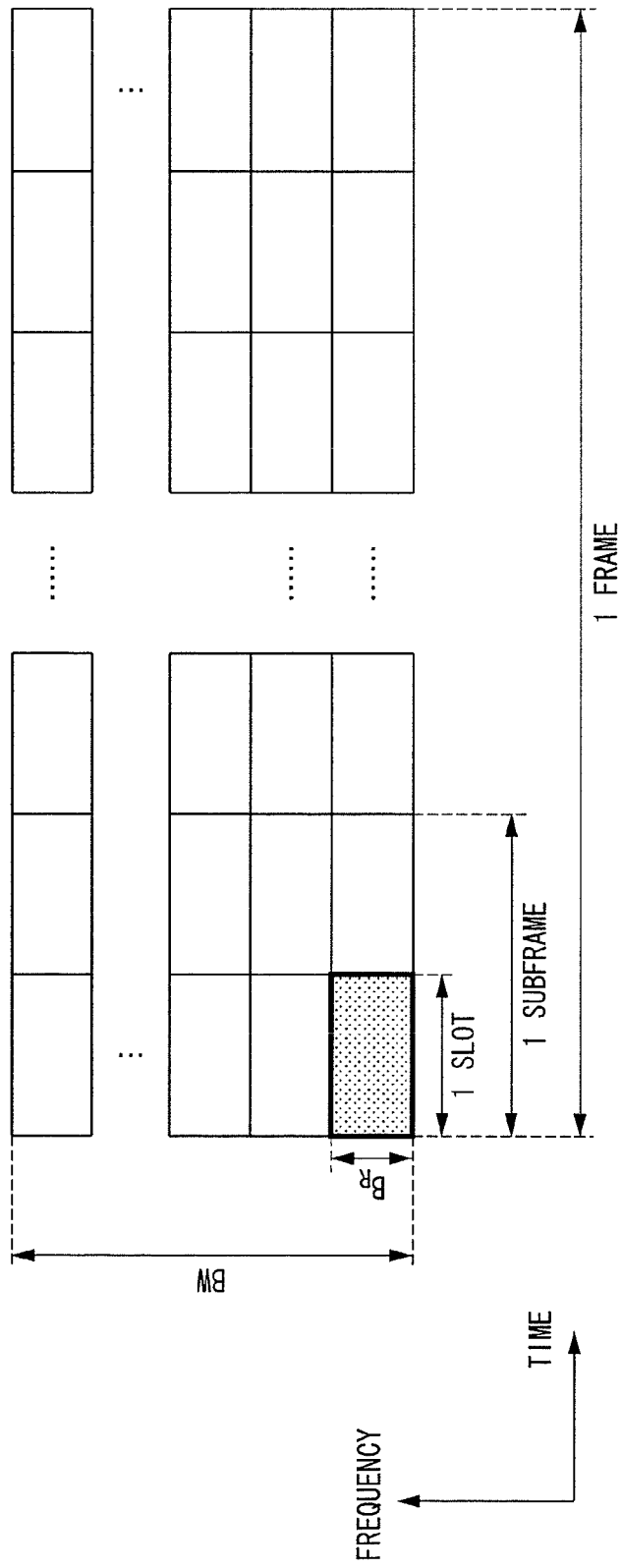
FIG. 1 is a figure that shows an example of the constitution of the radio frame that is used in an embodiment of the present invention.

FIG. 1 is a figure that shows an example of a constitution of a radio frame that is used in an embodiment of the present invention (the first through third embodiments of the present invention). In FIG. 1, the time axis is taken along the horizontal axis, and the frequency axis is taken along the vertical axis. The radio frame is constituted by having a fixed frequency region (BR) that is constituted by a set of subcarriers along the frequency axis and a domain that is constituted by a fixed transmission time interval (slot) serve as single units.

Also, the transmission time interval that is constituted from an integral multiple of one slot is called a subframe. Moreover, a plurality of subframes are called a frame. FIG. 1 shows the case of one subframe being constituted from two slots. The region that is divided by this fixed frequency region (BR) and the one slot length called a resource block in the downlink signal from the base station device to the mobile station device, and is called a resource unit in the uplink signal from the mobile station device to the base station device.

BW in FIG. 1 denotes the system bandwidth, while BR denotes the bandwidth of the resource block (or resource unit).

Figure 2:
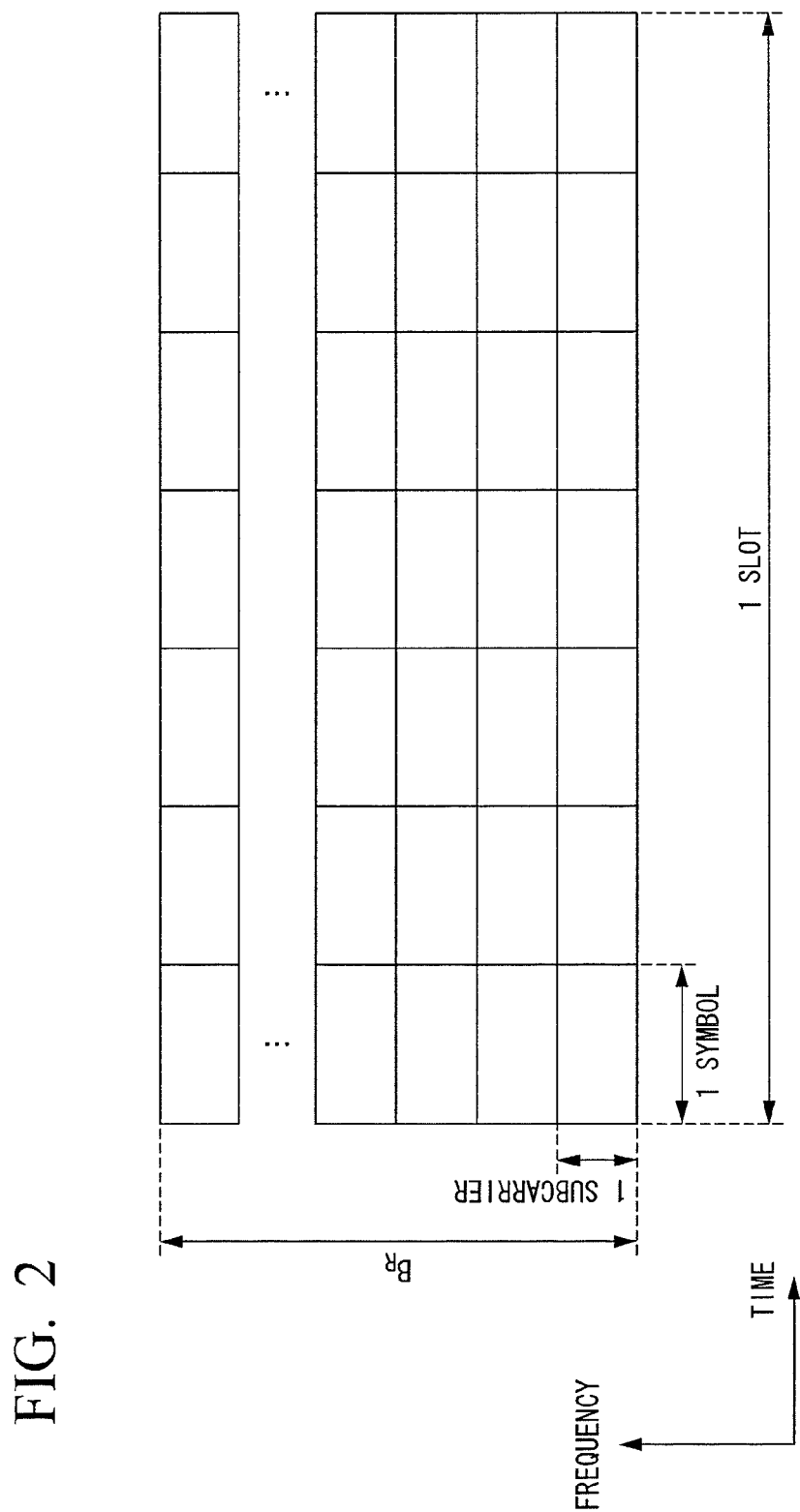
FIG. 2 is figure that shows an example of the constitution of the uplink slot that is used in an embodiment of the present invention.

FIG. 2 is a figure that shows an example of the constitution of an uplink slot that is used in the embodiment of the present invention. In FIG. 2, the time axis is taken along the horizontal axis, and the frequency axis is taken along the vertical axis. An uplink slot is constituted from a plurality of symbols, and the constitution of the smallest resource that is constituted from one subcarrier and one symbol is called a resource element. BR in the figure shows the bandwidth of a resource unit. FIG. 2 shows the case of the uplink 1 slot being constituted from 7 symbols.

In addition, in the actual mobile communication system, the composition of the resource unit may differ from FIG. 2. For example, one slot may consist of another symbol number instead of seven symbols.

Next, the physical channel used in the embodiment of the present invention, and its role shall be described. A physical channel is divided into a data channel and a control channel. A control channel includes a synchronization channel, a broadcast information channel, a random access channel, a downlink reference signal, an uplink reference signal, a downlink common control channel, and an uplink common control channel.

The synchronization channel is a downlink channel for transmitting a known signal pattern from a base station device in order for the mobile station device to achieve radio synchronization with the base station device, and is a channel that receives for the cell search procedure of the mobile station device in EUTRA. That which transmits a signal using this synchronization channel is the base station device.

The broadcast information channel is a downlink channel for transmitting information that mobile station devices in a certain area use in common, and not to a specific mobile station device. A mobile station device acquires peripheral cell information or the like by the broadcast information channel. That which transmits a signal using this broadcast information channel is the base station device.

The random access channel (RACH: Random Access Channel) is classified into an asynchronous random access channel and a synchronous random access channel, and the asynchronous random access channel is an uplink channel that is used for performing uplink transmission in the case of a usable radio resource not being scheduled, without the mobile station device being uplink synchronized. That which transmits a signal using this random access channel is a mobile station device.

The asynchronous random access channel, using a data series that is mutually orthogonal, transmits this orthogonal data series, whereby even if the uplink transmission timing is the same, if a different orthogonal data series, the radio signal can be separated at the base station device. The orthogonal data series is called a signature, and a signal that is constituted from a signature is called a preamble. This signature is used by the base station device for identifying a mobile station device.

In EUTRA, an asynchronous random access channel is used for such purposes as position registration of a mobile station device, notification of information relating to handover to the base station device of the handover destination, request of radio resources, data transmission during intermittent transmission, maintenance of uplink radio synchronization, and moreover notifies the purpose of use and quality information index (CQI: Channel Quality Indicator) by the asynchronous random access channel from the mobile station device to the base station device, and optimizes the subsequent resource allocation and scheduling.

On the other hand, even in the case of uplink synchronization, a random access channel that transmits in a state of no scheduling of a radio resource is called a synchronous random access channel.

The downlink reference signal (DL-RS) is transmitted by utilizing the downlink channel from the base station device to a mobile station device. The mobile station device judges the downlink receiving quality by measuring the downlink reference signal. Receiving quality is notified to the base station device using an uplink common control channel as the CQI, which is the quality information index. The base station device performs downlink scheduling to the mobile station device based on the CQI that has been notified from the mobile station device.

Note that as the receiving quality, it is possible to use the SIR (Signal-to-Interference Ratio), SINR (Signal-to-Interference plus Noise Ratio), SNR (Signal-to-Noise Ratio), CIR (Carrier-to-Interference Ratio), BLER (Block Error Rate), path loss, or the like.

The uplink reference signal (UL-RS) is transmitted from a mobile station device to a base station device using an uplink channel. By measuring the uplink reference signal, the base station device judges the reception quality of the uplink radio transmission signal of the mobile station device. The station device performs uplink scheduling based on reception quality. The uplink reference signal calculates the variation of the amplitude, phase, or frequency of an uplink data channel, and is used also as a reference signal for demodulating a signal transmitted using the uplink data channel.

The downlink common control channel (PDCCH: Physical Downlink Control Channel) is a downlink channel that is transmitted from a base station device to a mobile station device, and is used in common for a plurality of mobile station devices. The base station device uses the downlink common control channel for transmission of transmitting timing information and scheduling information (uplink/downlink resource allocation information).

The uplink common control channel (PUCCH: Physical Uplink Control Channel) is an uplink channel used for transmission of a signal from a mobile station device to a base station device. A mobile station device uses the uplink common control channel for notifying information such as the quality information index (CQI or the like), HARQ (Hybrid Auto Repeat Request), ACK/NACK (Acknowledge/Not Acknowledge) to the base station device.

Figure 3:
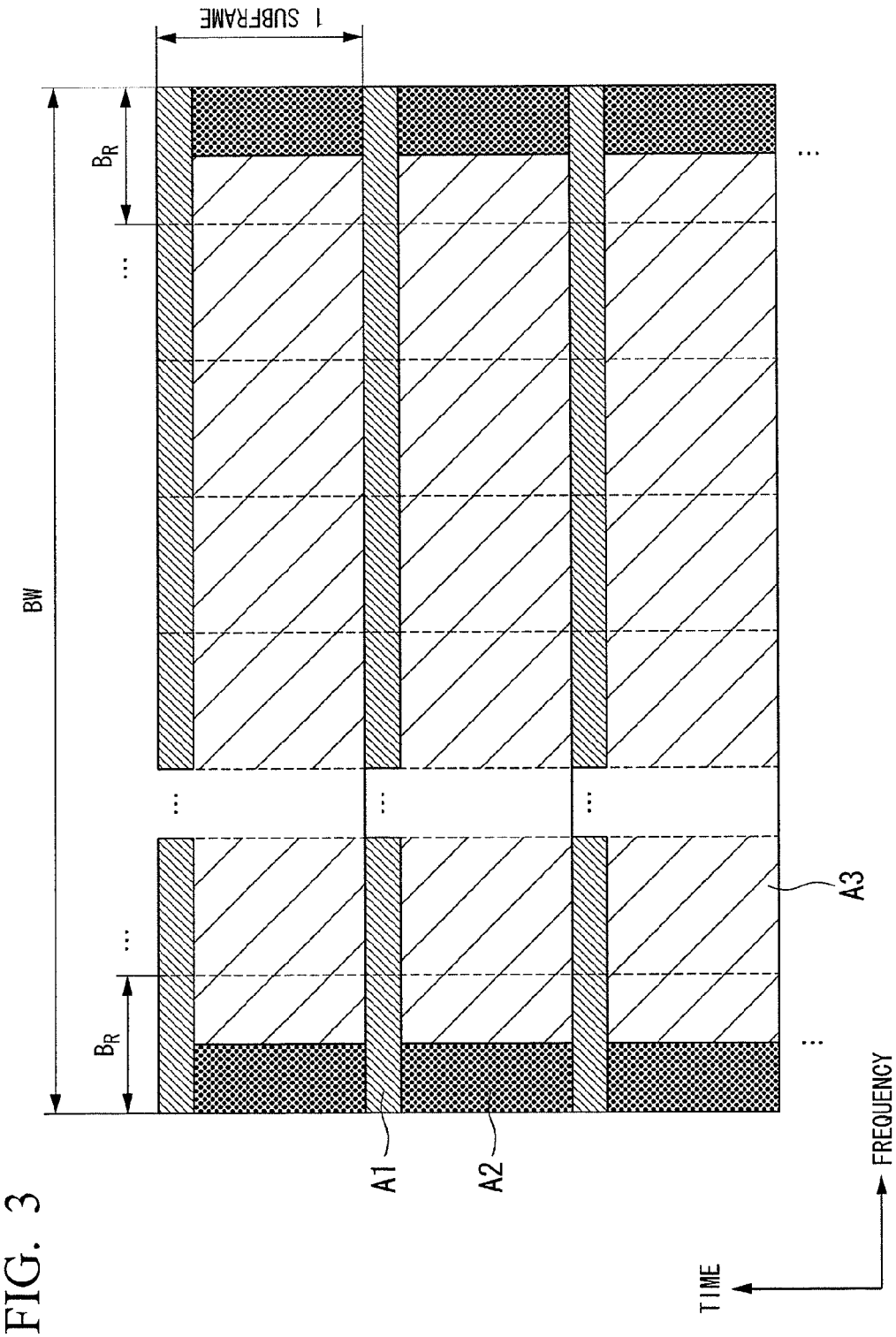
FIG. 3 is a figure that shows an example of the constitution of the uplink channel in an embodiment of the present invention.

FIG. 3 is a figure that shows an example of the composition of the uplink channel in the embodiment of a present invention. In FIG. 3, the frequency axis is taken along the horizontal axis, and the time axis is taken along the vertical axis. BW in FIG. 3 shows the system bandwidth, and BR shows the bandwidth of the resource unit. An uplink reference signal A1 is arranged at the lead symbol of each subframe. Also, a signal A2 that is transmitted from the uplink common control channel is arranged on both sides of the system bandwidth. A signal A3 that is transmitted by the data channel is arranged at other radio resources.

In addition, the composition of the uplink channel in an actual mobile communications system may differ from FIG. 3. For example the uplink reference signal A1 or the signal A2 that is transmitted by the uplink common control channel A2 may be distributed on the frequency axis, or may be cyclically arranged on the time-axis.

(First Embodiment)

Next, a mobile communication system in accordance with the first embodiment of the present invention shall be described. The mobile communication system is provided with a mobile station device 10a (refer to FIG. 4 mentioned later) and a base station device 30a (refer to FIG. 5 mentioned later).

Figure 4:
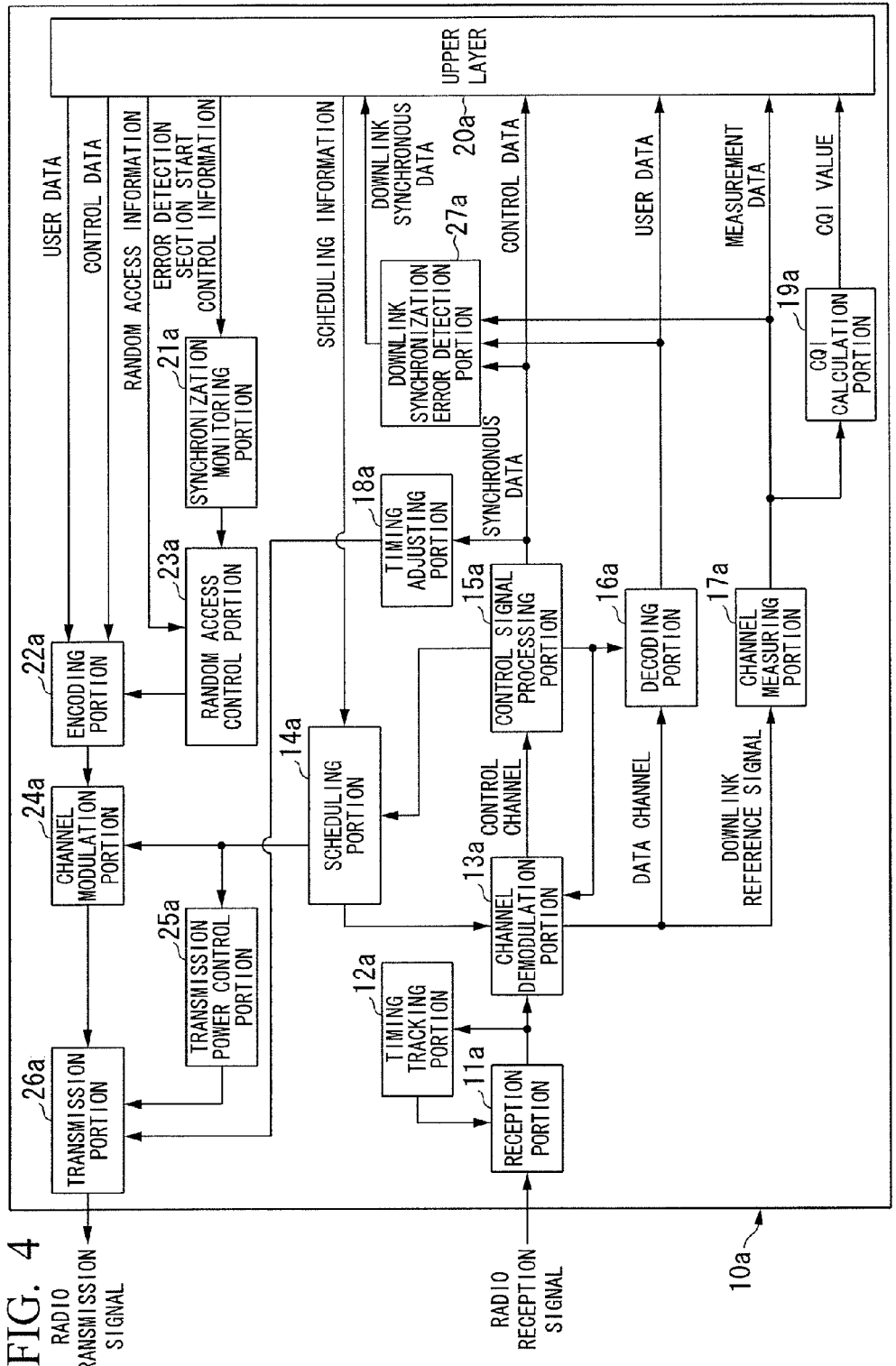
FIG. 4 is a figure that shows an example of the constitution of the mobile station device 10a in accordance with the first embodiment of the present invention.

FIG. 4 is a block diagram that shows an example of the composition of the mobile station device 10a in accordance with the first embodiment of the present invention. This mobile station device 10a is provided with a reception portion 11a, a timing tracking portion 12a, a channel demodulation portion 13a, a scheduling portion 14a, a control signal processing portion 15a, a decoding portion 16a, a channel measuring portion 17a, a timing adjusting portion 18a, a CQI calculation portion 19a, an upper layer 20a, a synchronization monitoring portion 21a, an encoding portion 22a, a random access control portion 23a, a channel modulation portion 24a, a transmission power control portion 25a, a transmission portion 26a, and a downlink synchronization error detection portion 27a.

A radio reception signal that a radio transmission signal that is transmitted by the base station device 30a and received by the mobile station device 10a is received in the reception portion 11a. A radio reception signal is output to the timing tracking portion 12a, and the signal of the result of the tracking is returned to the reception portion 11a, whereby the discrepancy of the symbol timing is adjusted. Moreover, the radio reception signal is output to the channel demodulation portion 13a, and is demodulated based on scheduling information that is input from the scheduling portion 14a, and is classified into a data channel signal, a control channel signal, and a downlink reference signal. As for the classified signals of the channels, the data channel signal is transmitted to the decoding portion 16a, the control channel signal is transmitted to the control signal processing portion 15a, and the downlink reference signal is transmitted to the channel measuring portion 17a. Note that in the case of the signals of other channels, they are output to the decoding portion 16a, the control signal processing portion 15a, and the channel measuring portion 17a, respectively, as required.

The decoding portion 16a extracts user data from the signal that the channel demodulation portion 13a has demodulated and outputs it to the upper layer 20a. The control signal processing portion 15 extracts control data from the signal that the channel demodulation portion 13a has demodulated and outputs it to the upper layer 20a. In the case of synchronous data (uplink timing adjustment control data) for performing adjustment of the uplink transmission timing being included in the extracted control data, the uplink timing adjustment control data is output to the timing adjusting portion 18a.

The timing adjusting portion 18a calculates the discrepancy of the uplink transmission timing from uplink timing adjustment control data, and adjusts the uplink transmission timing of the transmission portion 26a. Moreover, the scheduling information that is included in the control channel is output to the scheduling portion 14a. In the channel measuring portion 17a, while measuring the receiving quality of the downlink reference signal and outputting it to the upper layer 20a as measurement data, the above-mentioned reception quality is output to the CQI calculation portion 19a. The CQI calculation portion 19a calculates the CQI from reception quality, and outputs it to the upper layer 20a as a CQI value.

As the calculation method of CQI in the CQI calculation portion 19a, it is possible to use a method that finds it from the instantaneous value of a downlink reference signal each time, or a method that finds it by averaging a certain predetermined reception time. Also, it is acceptable to calculate the CQI in subcarrier units, and it is acceptable to calculate the CQI by averaging across a certain reception band. The reception quality of each channel is input into the downlink synchronization error detection portion 27a, and judgment processing of the downlink synchronization error is performed. The judgment result is input to the upper layer 20a as downlink synchronous data. Note that detection of the downlink synchronization error and information of the downlink synchronization state are included in the downlink synchronous data.

User data and control data are input from the upper layer 20a to the encoding portion 22a, and are encoded as a radio transmission signal. Control data includes the uplink reference signal and the signal of the uplink common control channel. Moreover, scheduling information is input into the scheduling portion 14a from the upper layer 20a. The timing and multiplexing method of the transmission signal concerning the uplink channel and downlink channel, and information of the modulation and demodulation is included in the scheduling information.

Also, during transmission of the signal by the random access channel from the mobile station device 10a to the base station device 30a, predetermined random access information, such as the reason for use of a random access channel and the like, is input into the random access control portion 23a, and after selection of a preamble is performed, it is encoded by the encoding portion 22a. Each radio transmission signal encoded by the encoding portion 22a is input into the channel modulation portion 24a. In the synchronization monitoring portion 21a, when the state of downlink synchronization has transitioned to the error detection interval, the error detection interval start control information is input from the upper layer 20a. The synchronization monitoring portion 21a into which the above-mentioned error detection interval start control information has been input generates random access information that is required in order to notify the transition of the error detection interval to the base station device 30a using the random access channel, and inputs the above-mentioned random access information to the random access control portion 23a.

The channel modulation portion 24a performs modulation processing of the radio transmission signal with a suitable modulation method according to the scheduling information transmitted from the scheduling portion 14a. The transmission power control portion 25a outputs a signal to the transmission portion 26a according to directions of the scheduling portion 14a to perform suitable electric power control for each channel. The data that has been modulated by the channel modulation portion 24a is input to the transmission portion 26a, and by being subject to electric power control from the transmission power control portion 25a, is transmitted as a radio transmission signal. In addition, the operation of the blocks of FIG. 4 is controlled in an integrated manner by the upper layer 20a.

Figure 5:
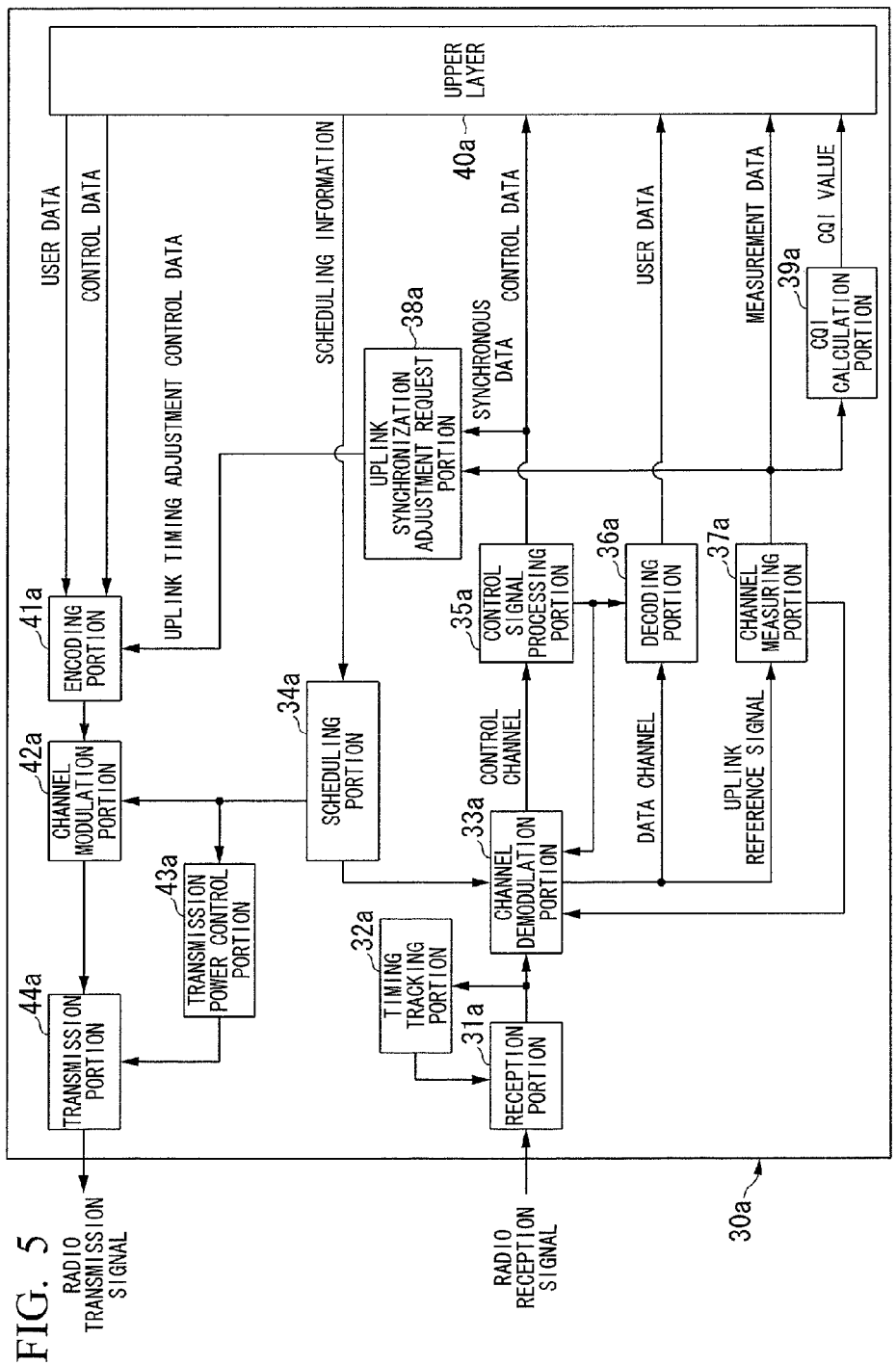
FIG. 5 is a figure that shows an example of the constitution of the base station device 30a in accordance with the first embodiment of the present invention.

FIG. 5 is a block diagram showing an example of the composition of the base station device 30a in accordance with the first embodiment of the present invention. This base station device 30a is provided with a reception portion 31a, a timing tracking portion 32a, a channel demodulation portion 33a, a scheduling portion 34a, a control signal processing portion 35a, a decoding portion 36a, a channel measuring portion 37a, an uplink synchronization adjustment request portion 38a, a CQI calculation portion 39a, an upper layer 40a, an encoding portion 41a, a channel modulation portion 42a, a transmission power control portion 43a, and a transmission portion 44a.

A radio reception signal that is a radio transmission signal that the mobile station device 10a transmits and the base station device 30a receives is received in the reception portion 31a. A radio reception signal is output to the timing tracking portion 32a, and the signal of the result of the tracking is returned to the reception portion 31a, whereby the discrepancy of the symbol timing is adjusted. Moreover, the radio reception signal is output to the channel demodulation portion 33a, and based on the scheduling information from the scheduling portion 34a, is divided into a data channel signal, a control channel signal, and an uplink reference signal and respectively demodulated. As for the demodulated data, if the signal of the data channel, it is output to the decoding portion 36a, if it is the uplink reference signal, it is output to the control signal processing portion 35a, and if the uplink reference signal, it is output to the channel measuring portion 37a. In addition, the channel demodulation portion 33a is controlled also by the output of the control processing portion 35a.

Note that in the case of signals other than the data channel signal, the control channel signal, and the uplink reference signal, they are output to the control signal processing portion 35*a*, the decoding portion 36*a*, and the channel measuring portion 37*a*, respectively, as required.

In the decoding portion 36*a*, based on the control signal which is an output of the control signal processing portion 35*a*, decoding processing of user data is performed and is output to the upper layer 40*a*. In the control signal processing portion 35*a*, control data is extracted and it output to the upper layer 40*a*. Also, the control data of the channel demodulation portion 33*a* and the decoding portion 36*a* and the control data relevant to control of scheduling are output to each block.

The channel measuring portion 37*a* measures the reception quality based on the uplink reference signal and outputs it as measurement data to the upper layer 40*a* and also outputs the aforementioned reception quality to the CQI calculation portion 39*a*. The CQI calculation portion 39*a* calculates the CQI from the reception quality, and outputs it to the upper layer 40*a* as a CQI value. Moreover, the output of the channel measuring portion 37*a* is output also to the channel demodulation portion 33*a* as reference data for channel demodulation.

User data and control data are input to the encoding portion 41*a*, with the transmission request from the upper layer 40*a* serving as a trigger. The control data includes the signal of the synchronous channel, the signal of a broadcast information channel, the downlink reference signal, and the signal of the downlink common control channel. Furthermore, uplink timing adjustment control data is input to the encoding portion 41*a* from the uplink synchronous adjustment request portion 38*a*. The uplink synchronous adjustment request portion 38*a* outputs uplink timing adjustment control data based on the synchronous data that is the output of the control signal processing portion 35*a*, and the measurement data that is the output of the channel measuring portion 37*a*.

Also, scheduling information is input to the scheduling portion 34*a* from the upper layer 40*a*. The user data and control data that have been encoded by the encoding portion 41*a*, and the uplink timing adjustment control data are input to the channel modulation portion 42*a*. The channel modulation portion 42*a* performs modulation processing of each radio transmission signal with a suitable modulation method according to the scheduling information transmitted from the scheduling portion 34*a*. The transmission power control portion 43*a* outputs a signal to the transmission portion 44*a* according to directions of the scheduling portion 34*a*, and performs suitable electric power control for each channel. The data that has been modulated by the channel modulation portion 42*a* is input to the transmission portion 44*a*, and by being subject to electric power control from the transmission power control portion 43*a*, is transmitted as a radio transmission signal to the mobile station device 10*a*. In addition, the operation of the blocks of FIG. 5 is controlled in an integrated manner by the upper layer 40*a*.

Figure 6:
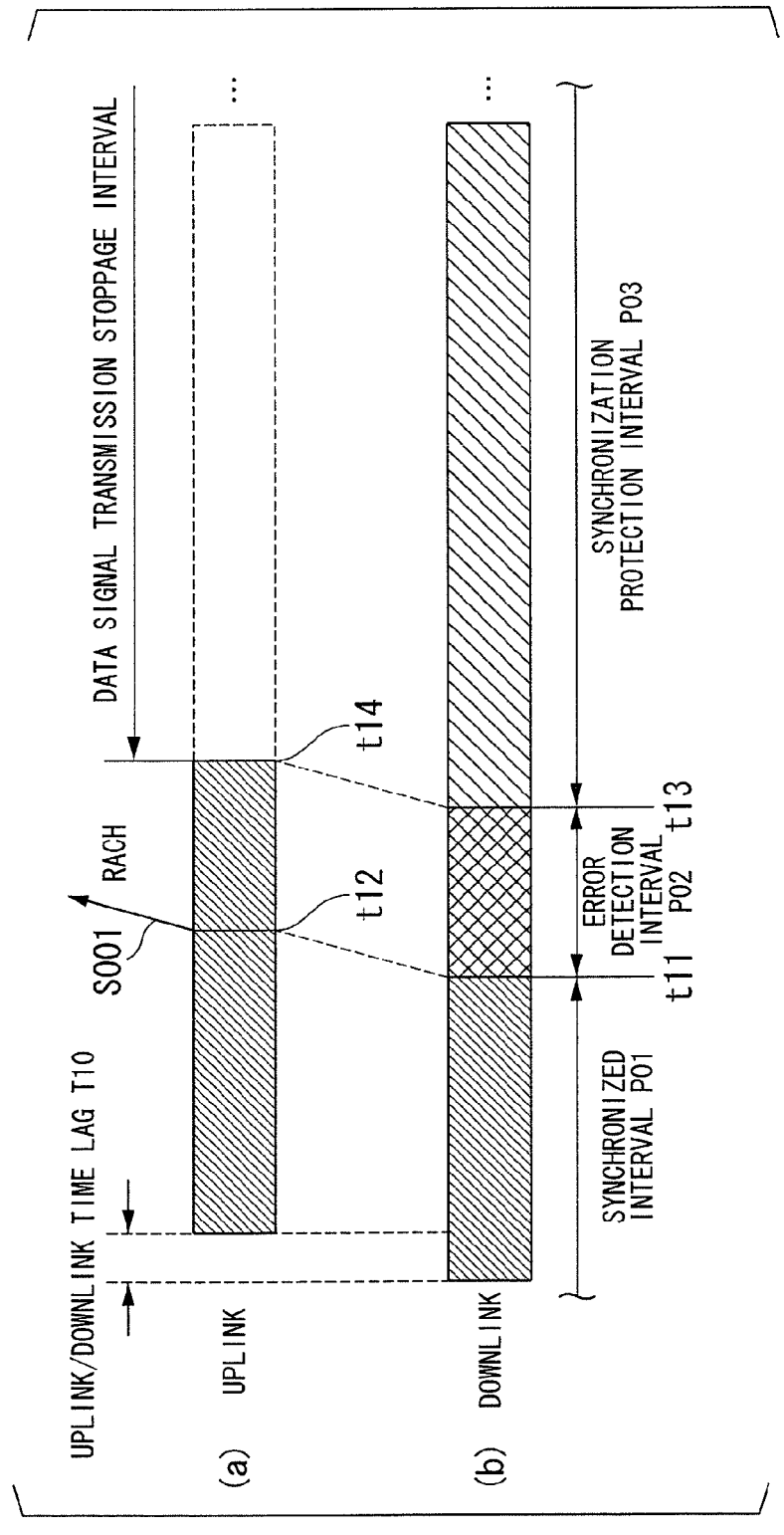
FIG. 6 is a figure for explaining the process of transmission of the mobile station device 10a to the base station device 30a and the subsequent reception in the first embodiment.

FIG. 6 (*a*) and FIG. 6 (*b*) are figures for explaining the process of transmission of the mobile station device 10*a* to the base station device 30*a* (FIG. 6 (*a*)) and the subsequent reception (FIG. 6 (*b*)) in the first embodiment. In both FIG. 6(*a*) and FIG. 6(*b*), the horizontal axis denotes time.

An uplink/downlink time lag of time T10 (for example, 3 milliseconds) occurs between the reception process in the mobile station device 10*a* (FIG. 6 (*b*)) and the transmission process in the mobile station device 10*a* (FIG. 6 (*a*))

In the first embodiment, the timing of transmitting a signal from the mobile station device 10*a* to the base station device 30*a* using a random access channel is the uplink transmission timing of the latest random access channel after detecting a downlink synchronization error (time t11), that is, after the state of downlink synchronization has transitioned from the synchronized interval P01 to the error detection interval P02.

Since the downlink synchronization and the uplink synchronization are controlled separately, at the stage at which a downlink synchronization error is initially detected, this utilizes the fact that there is a high probability of the uplink synchronization still being maintained.

The mobile station device 10*a* transmits a signal to the base station device 30*a* using a random access channel at the uplink transmission timing of the signal by the most recent random access channel (time t12) after detection of the downlink synchronization error (time t11) (Step S001).

At this time, information about the transmission purpose of the signal by the random access channel and the CQI value are included in the signal of the random access channel that is transmitted. Note that instead of the CQI value, there is also a method that notifies a bit that expresses whether the transmission quality if higher or lower than a predetermined threshold value.

The mobile station device 10*a* sets information that shows that the downlink synchronization error has been detected as a transmission purpose of the signal by the random access channel, and notifies it to the base station device 30*a*. The information that shows that the downlink synchronization error has been detected may be notified to the base station device 30*a* directly as a radio transmission signal, and may be indirectly notified by the preamble number and series of the signal of the random access channel, the transmission frequency region, and the like. For example, there is a method that allocates the No. 1 to 4 of the preamble numbers to the information for notification of downlink synchronization error detection. There is also a method that inverts or cyclic shifts the series of the random access channels when notifying downlink synchronization error detection. Also, there is a method that reserves a transmission frequency that transmits a random access channel for synchronization error detection and transmits in that frequency region.

It is acceptable to set in advance a specified CQI value that means downlink synchronization error detection between the mobile station device 10*a* and the base station device 30*a*. Information that associates the transmission purpose of the signal by a random access channel and the information that shows that the downlink synchronization error has been detected may be uniquely set between the mobile station device 10*a* and the base station device 30*a*, and by using a signal by the broadcast information channel, may be informed from the base station device 30*a* to the mobile station device 10*a*, and may also be individually notified from the base station device 30*a* to each mobile station device 10*a*

As mentioned above, an asynchronous random access channel and a synchronous random access channel exist in a random access channel, and the above-mentioned signal may be transmitted from the mobile station device 10*a* to the base station device 30*a* using either channel.

In addition, as the detection method of the downlink synchronization error in the mobile station device 10*a*, the downlink synchronization error detection portion 27*a* judges detection of a downlink synchronization error when the reception quality of the signal transmitted from the base station device 30*a* has fallen below a predetermined threshold value.

In addition, any downlink channel can be used for the detection method of the downlink synchronization error in the mobile station device 10*a*. As the detection method of a downlink synchronization error, it is possible to use a method that measures at least one of the qualities of the downlink channel (the aforementioned SIR, SINR, SNR, path loss, bit error rate, and the like) for a given time, and compares it with a threshold value set in advance in the mobile transmission system or a threshold value that is notified from the base station device 30a to the mobile station device 10a before measurement starts.

When the downlink synchronization state has transitioned from the error detection interval P02 to the synchronization protection interval P03 (time t13), in the subsequent data signal transmission stoppage interval, the mobile station device 10a stops transmission of a signal by the uplink data channel that has been scheduled (time t14) and performs the downlink synchronization recovery process.

Figure 7:
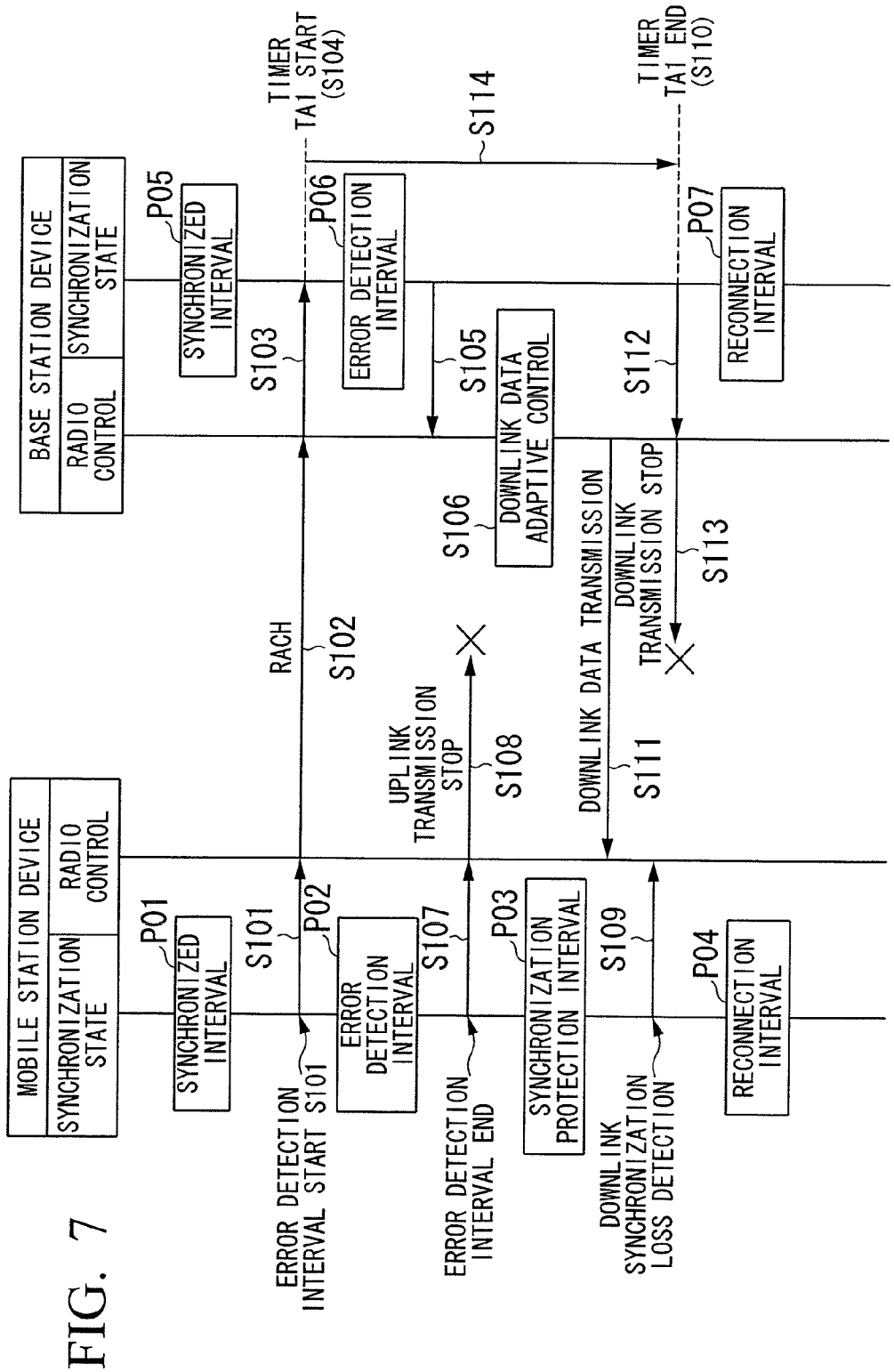
FIG. 7 is a sequence diagram that shows the processing of the mobile communication system in accordance with the first embodiment of the present invention.

FIG. 7 is a sequence diagram that shows the processing of the mobile communication system in accordance with the first embodiment of the present invention. FIG. 7 shows the transition of the downlink synchronization state of the mobile station device 10a and the base station device 30a during the occurrence of downlink synchronization loss and the related radio control processing. The processing of FIG. 7 starts from the state of the synchronized intervals P01 and P05 in which the mobile station device 10a and the base station device 30a are mutually communicating.

Due to reasons such as downlink quality degradation, when the downlink synchronization state of the mobile station device 10a side has transitioned from the synchronized interval P01 to the error detection interval P02, as radio control of the mobile station device 10a, a CQI value and information that shows detection of a downlink synchronization error as a transmission purpose is placed in the random access channel (RACH) to notify the base station device 30a (Steps S101, S102, S103).

Note that even if the information that shows that a downlink synchronization error was detected is not set to the random access channel, if the downlink synchronization state of the mobile station device 10a is the synchronized interval P01, by receiving the signal of the random access channel that is not transmitted, the base station device 30a may determine that a downlink synchronization error has occurred in the mobile station device 10a.

In the base station device 30a that has received the signal from the mobile station device 10a by the above-mentioned random access channel, the downlink synchronization state is transitioned from the synchronized interval P05 to the error detection interval P06, and the timer is simultaneously started (Step S104). In the present embodiment, the timer measures time Ta1 (for example, 3 seconds) that has been set beforehand. Also, the channel modulation portion 42a of the base station device 30a performs adaptive control on the downlink data transmitted from the base station device 30a to the mobile station device 10a (Steps S105, S106). Here, the time Ta1 that the timer times is determined based on the time of the error detection interval P06 and the maximum transmission delay time of the signal of the random access channel.

The base station device 30a, when notified of detection of a downlink synchronization error using a random access channel from the mobile station device 10a (Steps S101, S102, S103), performs the following adaptive control on the signal that is transmitted to the mobile station device 10a based on information that has been notified.

When the CQI value that is been notified by the random access channel is lower than the CQI value notified the previous time from the mobile station device 10a, recovering the downlink synchronization of the mobile station device 10a is facilitated by increasing the downlink quality of the signal that the base station device 30a transmits to the mobile station device 10a by switching to a modulation method with a high error correction capability by the channel modulation portion 42a, increasing the downlink transmission power with the transmission power control portion 43a, or performing both. For example, by switching from 64QAM (64 Quadrature Amplitude Modulation) to BPSK (Binary Phase Shift Keying), the channel modulation portion 42a is switched to a modulation method with a high error correction capability.

In addition, a radio resource block with a good CQI value may be preferentially allocated to that mobile station device 10a, or it is acceptable to switch to a transmission method that increases the frequency diversity effect by distributed arrangement of the radio transmission signal in a wide band. Also, it is acceptable to reduce the allocation of radio resources to the mobile station device 10a to improve the radio resource utilization efficiency. On the other hand, in the case that the CQI value that is notified from the mobile station device 10a to the base station device 30a being almost the same as the CQI value notified from the mobile station device 10a the previous time or exceeding it, a downlink synchronization error due to temporary quality degradation may be determined, and the usual radio resource allocation and scheduling may be continued.

When the downlink synchronization of the mobile station device 10a does not recover even if the aforementioned adaptive control is performed and the error detection interval P02 ends as is, the downlink synchronization state of the mobile station side 10a transitions from the error detection interval P02 to the synchronization protection interval P03. Thereby, the radio portion 26a of the mobile station device 10a, by performing uplink transmission stop control (Step S107), stops transmission of a signal from the mobile station side 10a to the base station device 30a (Step S108).

Specifically, the transmission portion 26a (also called a mobile station device transmission portion) of the mobile station device 10a stops transmission of the data signal to the base station device 30a when the downlink synchronization error detection portion 27a has detected a downlink synchronization error a predetermined number of times (for example, five times) or for a predetermined time (for example, 10 milliseconds). By performing such processing, it is possible to prevent the mobile station device 10a from transmitting a data signal to the base station device 30a in the state where the communication quality of the mobile station device 10a and the base station device 30a is poor.

Furthermore, when the downlink synchronization does not recover even if the synchronization protection interval P03 finishes, the downlink synchronization state on the mobile station device 10a side transitions from the synchronization protection interval P03 to the reconnection interval PO4. The radio portion 26a of the mobile station device 10a starts cell reselection control by being informed that the downlink synchronization error detection portion 27a has detected downlink synchronization loss (Step S109).

When the time Ta1 being measured by the timer has elapsed (Step S110), the base station device 30a transitions the downlink synchronization state of the base station device 30a from the error detection interval P06 to the reconnection interval P07, releases the uplink radio resources that had been allocated to the mobile station device 10a, and allocates them to another mobile station device. Also, downlink transmissions that include the downlink data resending by HARQ (Step S111) are completely stopped (Steps S112, S113), and the radio resources thereof are allocated to another mobile station device.

Moreover, even prior to expiration of the time Ta1, the base station device 30a stops transmission of a signal to the mobile station device 10a in the case of the occurrence of a downlink synchronization error not being notified from the mobile station device 10*a* for a predetermined time (for example, time Tr in FIG. 10 described below) after the occurrence of a downlink synchronization error is notified from the transmission portion 26*a* (also called a downlink synchronization error notification portion) of the mobile station device 10*a*.

While the timer is measuring time Ta1 (Step S114), when the base station device 30*a* has received the signal of an uplink reference signal or the signal of a random access channel for uplink transmission timing adjustment from the mobile station device 10*a*, and when the base station device 30*a* has normally received from the mobile station device 10*a* uplink data that had been scheduled or uplink data such as a scheduling request, the downlink synchronization of the mobile station device 10*a* is regarded as recovered, the timing of the time Ta1 by the timer is stopped, and the downlink synchronization state of the base station device 30*a* is transitioned to the synchronized interval P05 to return to normal processing.

Figure 8:
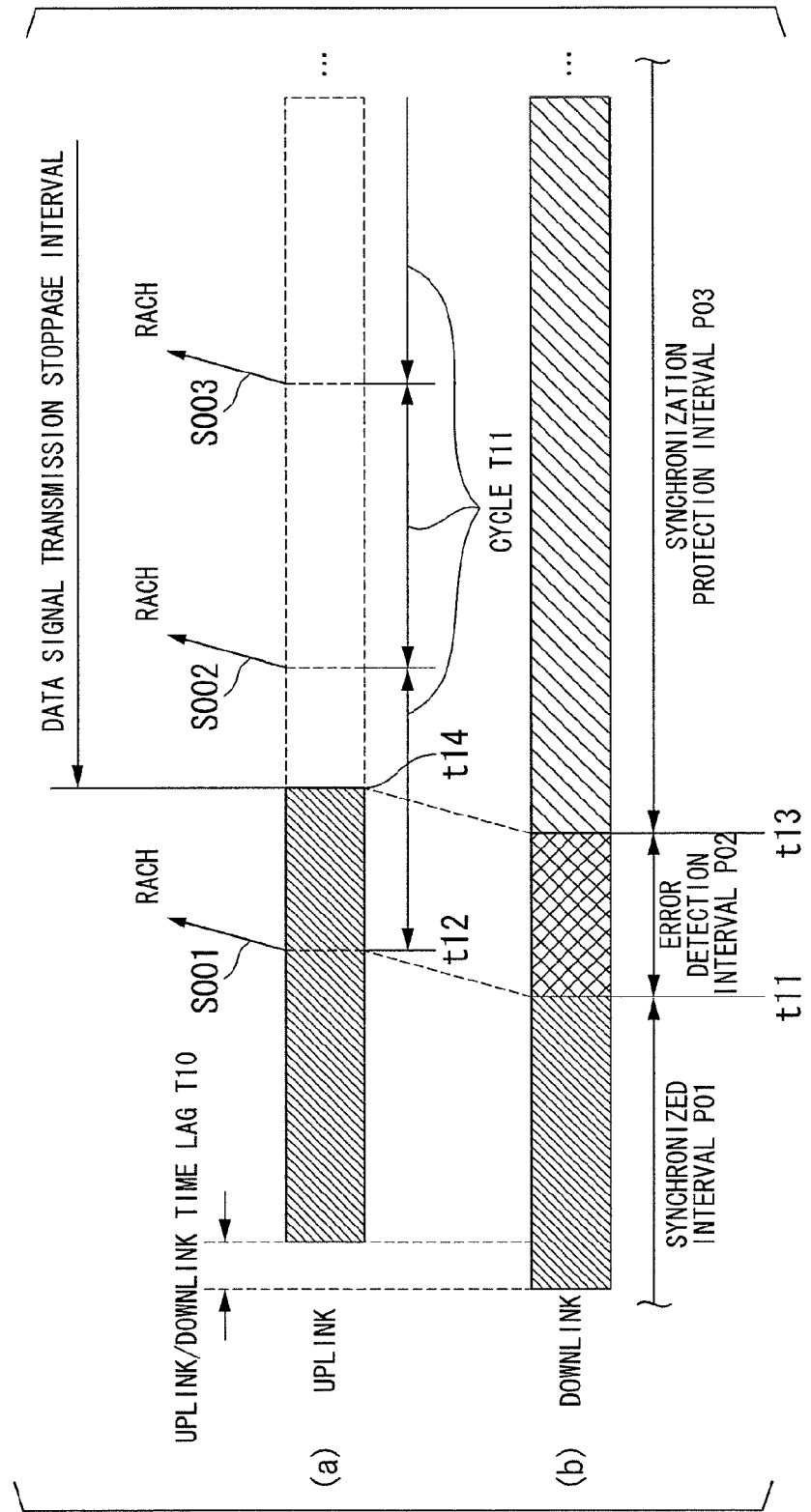
FIG. 8 is a figure for explaining another example of the process of transmission of the mobile station device 10a to the base station device 30a and the subsequent reception in the first embodiment.

FIG. 8 is a figure for explaining another example of processing of the transmission of the mobile station device 10*a* to the base station device 30*a* (FIG. 8 (*a*)) and the subsequent reception (FIG. 8 (*b*)) in the first embodiment. In FIG. 8, portions that are the same as in FIG. 6 shall be denoted by the same reference numerals, and descriptions thereof shall be omitted.

In FIG. 8, the mobile station device 10*a* detects a downlink synchronization error (time t11), and transmits that to the base station device 30*a* by a random access channel (time t12), after which a random access channel is repeatedly transmitted from the mobile station device 10*a* to the base station device 30*a* in a fixed cycle of time T11 (for example, 10 milliseconds) (Steps S001, S002, S003, . . . ).

The mobile station device 10*a*, simultaneously with transmitting a random access channel to the base station device 30*a* (time t12) starts the timer that times the time T11 by the upper layer 20*a*. Then, when the downlink synchronization recovers or does not reach downlink synchronization loss by the time the timing of the time T11 by the timer expires, a radio transmission signal that includes information about the transmission purpose to the base station device 30*a* and the CQI value is transmitted using the random access channel, and again the timing of the time T11 by the timer is started.

The time T11 that the timer measures is notified from the base station device 30*a* to the mobile station device 10*a* in advance. The time T11 that the timer measures is set to be shorter than the time of the synchronization protection interval P03. However, the time T11 that the timer measures can also be made the same as the uplink synchronization adjustment cycle. By doing so, the possibility increases of being able to notify the CQI value from the mobile station device 10*a* to the base station device 30*a* prior to the uplink synchronization being lost.

In the first embodiment of the present invention, it is possible to notify the CQI value from the mobile station device 10*a* to the base station device 30*a* in a fixed frequency and continuously even after the downlink synchronization state of the mobile station device 10*a* and transitions to the error detection interval P02. Therefore, the mobile station device 10*a* can return to the usual scheduling immediately after synchronization recovery. Moreover, the base station device 30*a* can be switched to adaptive control in which synchronization is more easily recovered based on the CQI value that is notified from the mobile station device 10*a* at a fixed cycle.

Figure 9:
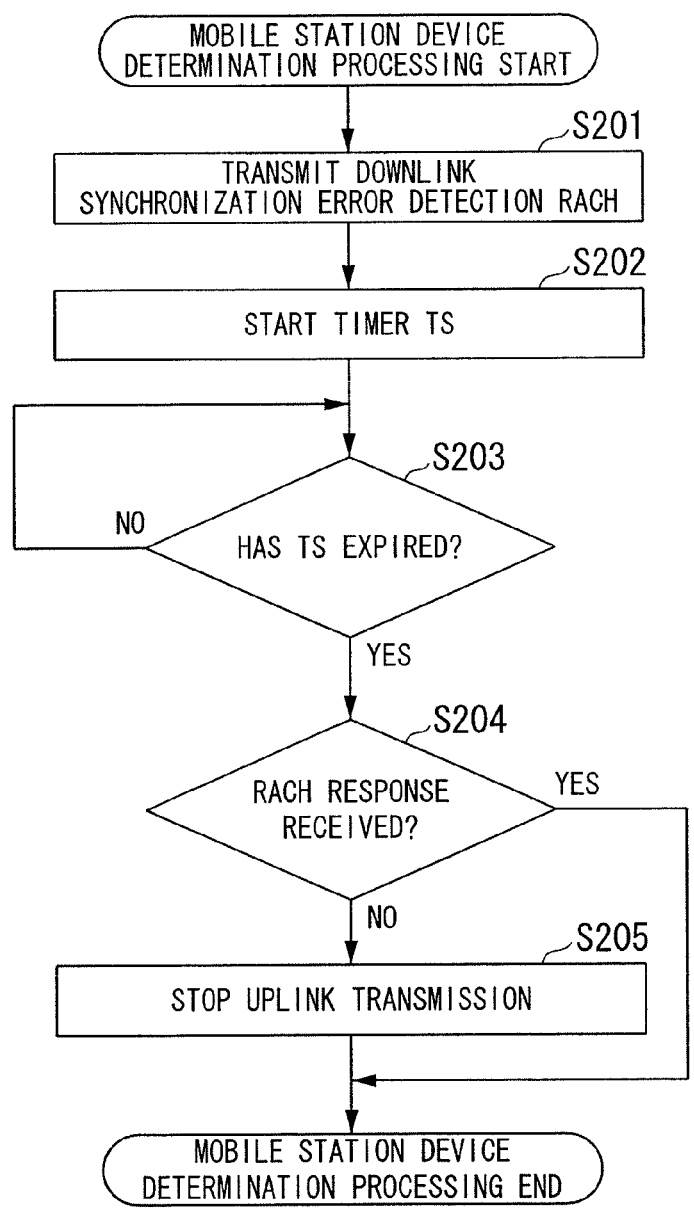
FIG. 9 is a flowchart that shows an example of the process of the mobile station device 10a in the first embodiment of the present invention.
Figure 10:
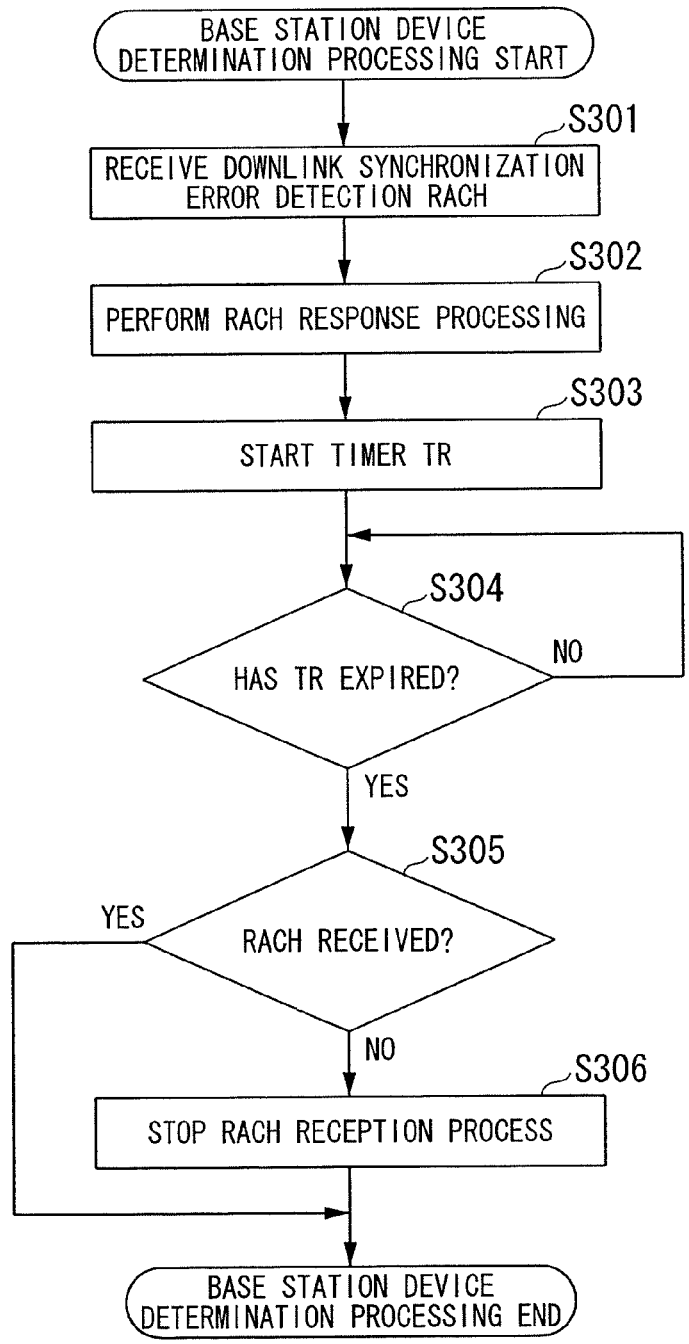
FIG. 10 is a flowchart that shows an example of the process of the base station device 30a in the first embodiment of the present invention.

In addition, in the first embodiment of the present invention, while performing the processing shown in the flowchart of FIG. 9 with the mobile station device 10*a*, it is possible to perform the processing shown in the flowchart of FIG. 10 with the base station device 30*a*.

As shown in FIG. 9, when a downlink synchronization error is detected in the mobile station device 10*a*, the mobile station device 10*a* transmits the aforementioned signal to the base station device 30*a* using a random access channel (RACH) (Step S201), and simultaneously with this, starts a timer to start measurement of the time Ts (for example, 10 milliseconds) (Step S202). After the mobile station device 10*a* transmits the signal to the base station device 30*a* by the random access channel, the maximum allowable time until a response to the signal is returned from the base station device 30*a* to the mobile station device 10*a* is set to the timer as the time Ts.

The mobile station device 10*a* stands by until the time Ts that the timer measures expires ("NO" at Step S203), and at the point at which measurement of the time Ts by the timer has expired ("YES" at step S203), when a response to the latest signal that has been transmitted using a random access channel from the mobile station device 10*a* to the base station device 30*a* is received from the base station device 30*a*, it is judged that the uplink synchronization with the base station device 30*a* is maintained ("YES" in Step S204), and the process according to the flowchart in FIG. 9 ends. After the processing of the flowchart of FIG. 9 ends, the same processing as FIG. 9 is performed at the uplink transmission timing of the signal by the random access channel.

When the mobile station device 10*a* cannot receive the response of the signal transmitted by the random access channel from the base station device 30*a* ("NO" in Step S204), it is determined that the uplink synchronization with the base station device 30*a* has been lost, and subsequently all uplink transmissions including random access channels are stopped (Step S205), and the processing according to the flowchart of FIG. 9 ends.

As shown in FIG. 10, when the base station device 30*a* has received from the mobile station device 10*a* a signal that shows that a downlink synchronization error was detected by the random access channel (RACH) (Step S301), response processing is performed on the signal transmitted from the mobile station device 10*a* to the base station device 30*a* by the random access channel (Step S302), and required information is transmitted from the base station device 30*a* to the mobile station device 10*a*.

ACK, uplink timing adjustment control data, and the like are contained in the reply signal to the signal of the random access channel received from the mobile station device 10*a*. Moreover, simultaneously with transmitting the response to the signal of a random access channel to the mobile station device 10*a*, a timer is started to start measurement of time Tr (for example, 10 milliseconds) (Step S303).

The time Tr that the timer measures is set so as to be equivalent to the time that added a delay time such as a propagation delay or processing delay to the transmission time interval of the signal using the random access channel by the mobile station device 10*a*. At this time, the transmission time interval and the uplink synchronization adjustment cycle may be the same. The base station device 30*a* stands by until the measurement of the time Tr by the timer expires ("NO" in Step S304), and at the point at which measurement of the time Tr by the timer has expired ("YES" at step S304), when a signal that used a random access channel has been received from the mobile station device 10*a* ("YES" in Step S305), it is determined that downlink synchronization has been completely lost, and the processing according to the flowchart of FIG. 10 ends. The base station device 30*a* performs the same processing as FIG. 10 again after the end of processing according to the flowchart of FIG. 10.

When the signal by the random access channel has not been received from the mobile station device ("NO" in Step S305), it is judged that downlink synchronization has been lost, and the base station device 30a stops the receiving process of the subsequent random access channels (Step S306), and the processing according to the flowchart of FIG. 10 ends.

By performing the processing of FIG. 10 with the base station device 30a along with performing the processing of FIG. 9 with the mobile station device 10a, even in the error detection interval or the synchronization protection interval, it becomes possible for the base station device 30a to estimate both of the uplink and downlink synchronization states, and so the base station device 30a becomes capable of performing efficient scheduling based on the uplink and the downlink synchronization states that were estimated.

In the first embodiment of the present invention, in the mobile station device 10a, the downlink synchronization error detection portion 27a detects a downlink synchronization error based on the signal transmitted from the base station device 30a, and when the downlink synchronization error detection portion 27a has detected a downlink synchronization error, the transmission portion 26a (also called the downlink synchronization error notifying portion) notifies the base station device 30a of the occurrence of the downlink synchronization error.

Moreover, in the first embodiment of the present invention, in the base station device 30a, in the event of being notified of the occurrence of a downlink synchronization error from the transmission portion 26a of the mobile station device 10a, the channel modulation portion 42a or the transmission power control portion 43a (also called adaptive control portions) perform adaptive control on the signal transmitted to a mobile station device, and the transmission portion 44a (also called a base station device transmission portion) transmits the signal on which the channel modulation portion 42a has performed adaptive control to the mobile station device 10a.

Therefore, by performing the adaptive control of the modulation method and the like so that a downlink synchronization error is easily recovered at the base station device 30a side according to the first embodiment of the present invention, even if a downlink synchronization error occurs at the mobile station device 10a, it is possible to promptly perform communication with the communication quality in a good state between the base station device 30a and the mobile station device 10a.

(Second Embodiment)

Next, a second embodiment of the present invention shall be described. The mobile communication system in accordance with the present embodiment is provided with a mobile station device 10b (refer to FIG. 11 mentioned below) and a base station device 30b (refer to FIG. 12 mentioned below). In the second embodiment, after passing through the downlink synchronization error detection interval, a signal is transmitted by a random access channel from the mobile station device 10b to the base station device 30b.

Figure 11:
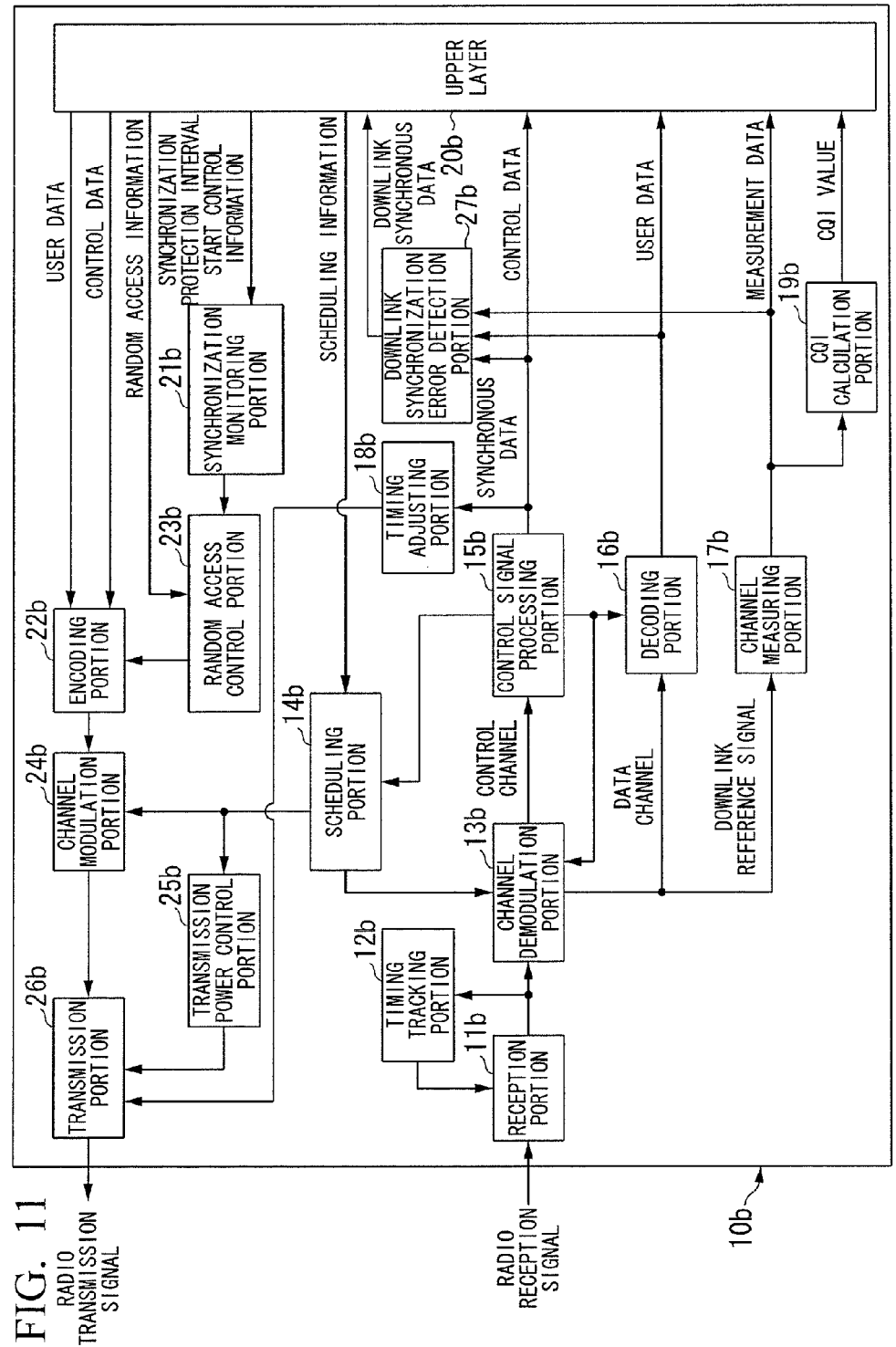
FIG. 11 is a block diagram that shows an example of the constitution of the mobile station device 10b in accordance with the second embodiment of the present invention.

FIG. 11 is a block diagram showing an example of the composition of the mobile station device 10b in accordance with the second embodiment of the present invention. This mobile station device 10b is provided with a reception portion 11b, a timing tracking portion 12b, a channel demodulation portion 13b, a scheduling portion 14b, a control signal processing portion 15b, a decoding portion 16b, a channel measuring portion 17b, a timing adjusting portion 18b, a CQI calculation portion 19b, an upper layer 20b, a synchronization monitoring portion 21b, an encoding portion 22b, a random access control portion 23b, a channel modulation portion 24b, a transmission power control portion 25b, a transmission portion 26b, and a downlink synchronization error detection portion 27b.

Since the parts 11b to 26b of the mobile station device 10b (FIG. 11) in accordance with the second embodiment have the same function as the parts 11a to 26a of the mobile station device 10a (FIG. 4) in accordance with the first embodiment, explanations thereof shall be omitted.

However, the second embodiment differs from the first embodiment on the point of information that is input from the upper layer 20b of the mobile station device 10b to the synchronization monitoring portion 21b being synchronization protection interval start control information that shows that the state of downlink synchronization has transitioned from the error detection interval to the synchronization protection interval.

Figure 12:
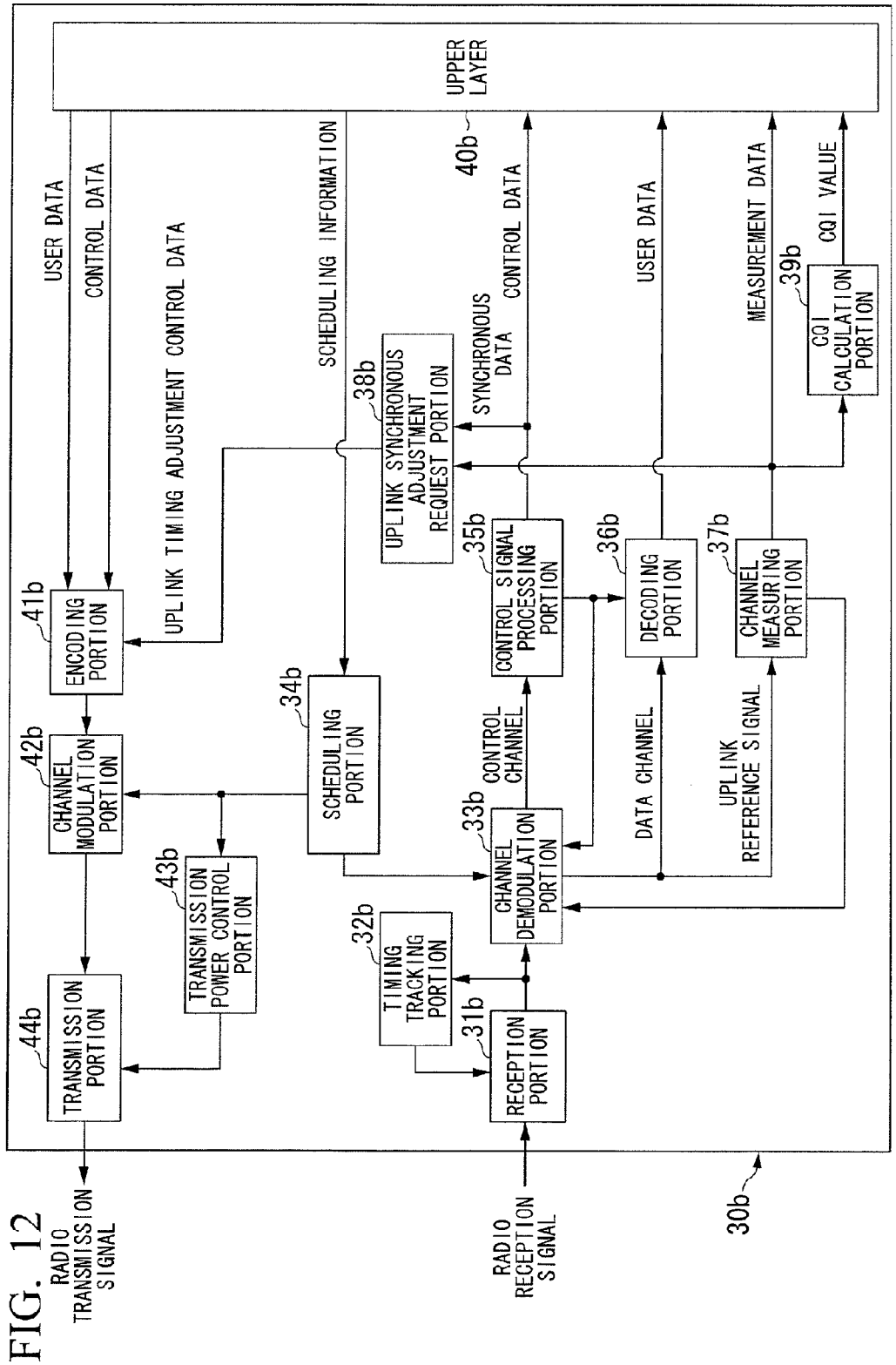
FIG. 12 is a block diagram that shows an example of the constitution of the base station device 30b in accordance with the second embodiment of the present invention.

FIG. 12 is a block diagram that shows an example of the composition of the base station device 30b in accordance with the second embodiment of the present invention. The base station device 30b is provided with a reception portion 31b, a timing tracking portion 32b, a channel demodulation portion 33b, a scheduling portion 34b, a control signal processing portion 35b, a decoding portion 36b, a channel measuring portion 37b, an uplink synchronous adjustment request portion 38b, a CQI calculation portion 39b, an upper layer 40b, an encoding portion 41b, a channel modulation portion 42b, a transmission power control portion 43b, and a transmission portion 44b.

Since the parts 31b to 44b of the base station device 30b (FIG. 12) in accordance with the second embodiment have the same function as the parts 31a to 44a of the base station device 30b (FIG. 5) in accordance with the first embodiment, explanations thereof shall be omitted.

Figure 13:
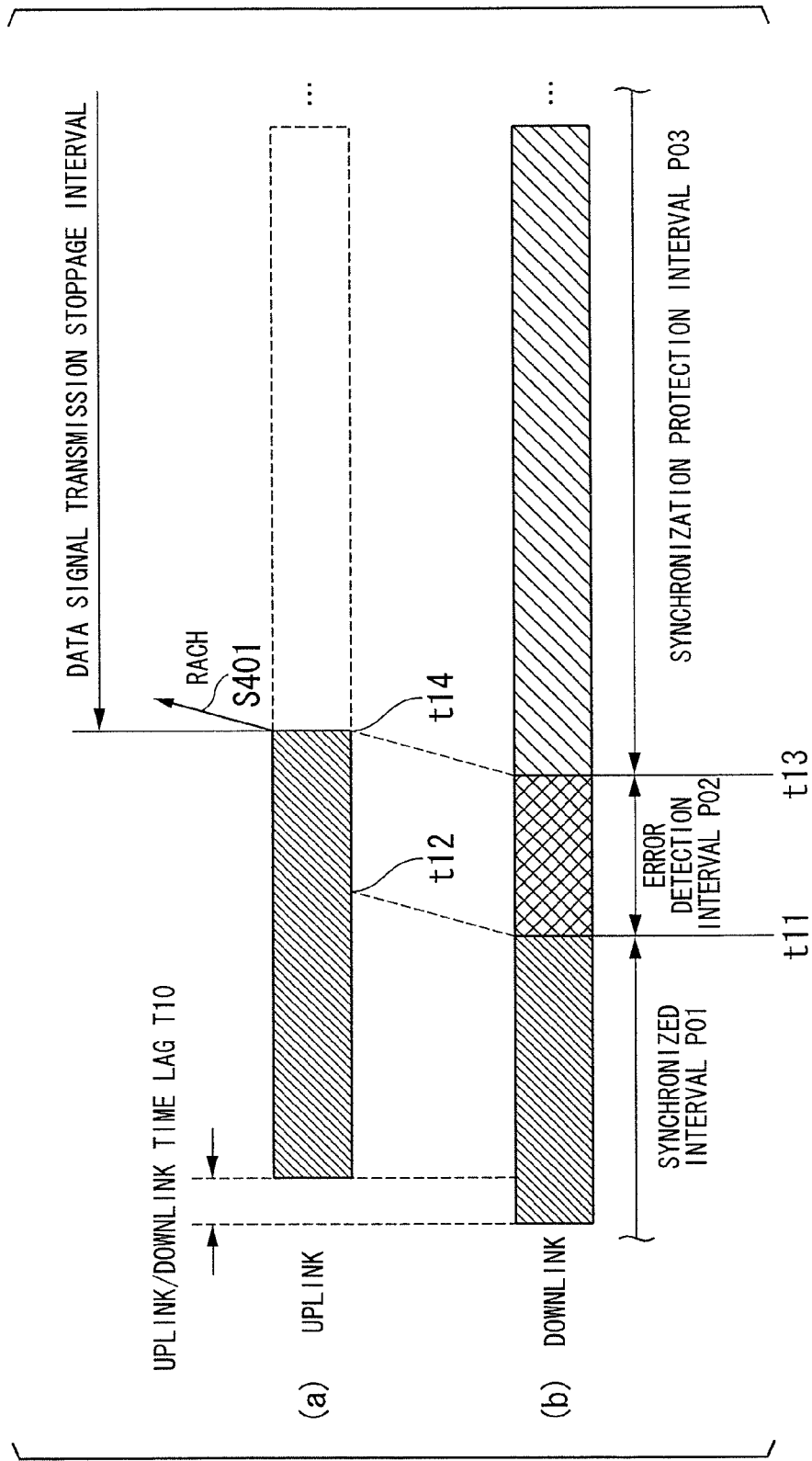
FIG. 13 is a figure for explaining the process of transmission of the mobile station device 10b to the base station device 30b and the subsequent reception in the second embodiment.

FIG. 13 (a) and FIG. 13 (b) are figures for explaining the process of transmission of the mobile station device 10b to the base station device 30b (FIG. 13 (a)), and subsequent reception (FIG. 13 (b)) in the second embodiment. In FIG. 13 (a) and FIG. 13 (b), the portions that are the same as FIG. 6 (a) and FIG. 6 (b) are denoted by the same reference numerals, and so descriptions thereof shall be omitted.

In the second embodiment, the timing of transmitting a signal from the mobile station device 10b to the base station device 30b using a random access channel is the uplink transmission timing of the latest random access channel after conclusion of the error detection interval P02 (time t13), that is, after the transition from the error detection interval P02 to the synchronization protection interval P03.

In the second embodiment, differing from the first embodiment, after a downlink synchronization error occurs a predetermined number of times (for example, 5 times) from time T11, or after a fixed time (for example, 10 milliseconds) has elapsed, using a random access channel, the detection of the downlink synchronization error is notified from the mobile station device 10b to the base station device 30b.

Thereby, the number of times of transmission of the signal by the random access channel of the mobile station device can be greatly reduced compared to the first embodiment, and so it becomes possible to restrict the power consumption of the mobile station device 10b.

The mobile station device 10b transmits a signal from the mobile station device 10b to the base station device 30b using a random access channel at the uplink transmission timing of the signal by the most recent random access channel after the downlink synchronization state has transitioned from the error detection interval P02 to the synchronization protection interval P03. At this time, information that shows the transmission purpose of the signal by the random access channel and the CQI value is included in the signal of the random access channel that is transmitted. Note that instead of the CQI value, there is also a method that notifies a bit that expresses whether the transmission quality if higher or lower than a predetermined threshold value.

The mobile station device 10b sets information that shows the occurrence of a downlink synchronization error as a transmission purpose of the signal by the random access channel, and notifies the base station device 30b of it. In the present embodiment, information that shows the occurrence of a downlink synchronization error means that the downlink synchronization state of the mobile station device 10b has transitioned from the error detection interval P02 to the synchronization protection interval P03.

The information of the transmission purpose of the signal by the random access channel (the information that shows that the downlink synchronization state is in the synchronization protection interval P03) may be directly notified from the mobile station device 10b to the base station device 30b as a radio transmission signal, and may be indirectly notified utilizing the preamble number and series of the signal of the random access channel, the transmission frequency region, and the like.

Or, a specific CQI value may be set in advance between the mobile station device 10b and the base station device 30b as one showing that the downlink synchronization state is the synchronization protection interval P03. The correlation of the transmission purpose of the signal by a random access channel and the information that shows that the downlink synchronization state is the synchronization protection interval P03 may be uniquely set in a mobile communication system, may be informed from the base station device 30b to the mobile station device 10b using a signal by the broadcast information channel, and may also be individually notified from the base station device 30b to each mobile station device 10b.

As mentioned above, an asynchronous random access channel and a synchronous random access channel exist in a random access channel, either may be used. In addition, it is possible to use any downlink channel for the detection method of the downlink synchronization error in the mobile station device 10b. As this detection method, it is possible to use a method that measures at least one of the qualities of the downlink channel (the aforementioned SIR, SINR, SNR, path loss, bit error rate, and the like) for a given time, and compares it with a threshold value that is set in advance in the mobile transmission system or a threshold value that is notified in advance from the base station device 30b to the mobile station device 10b prior to the start of measurement.

From time t14 onward, the mobile station device 10b stops transmission of the uplink data channel that was scheduled to the base station device 30b, and performs recovery processing of the downlink synchronization.

Figure 14:
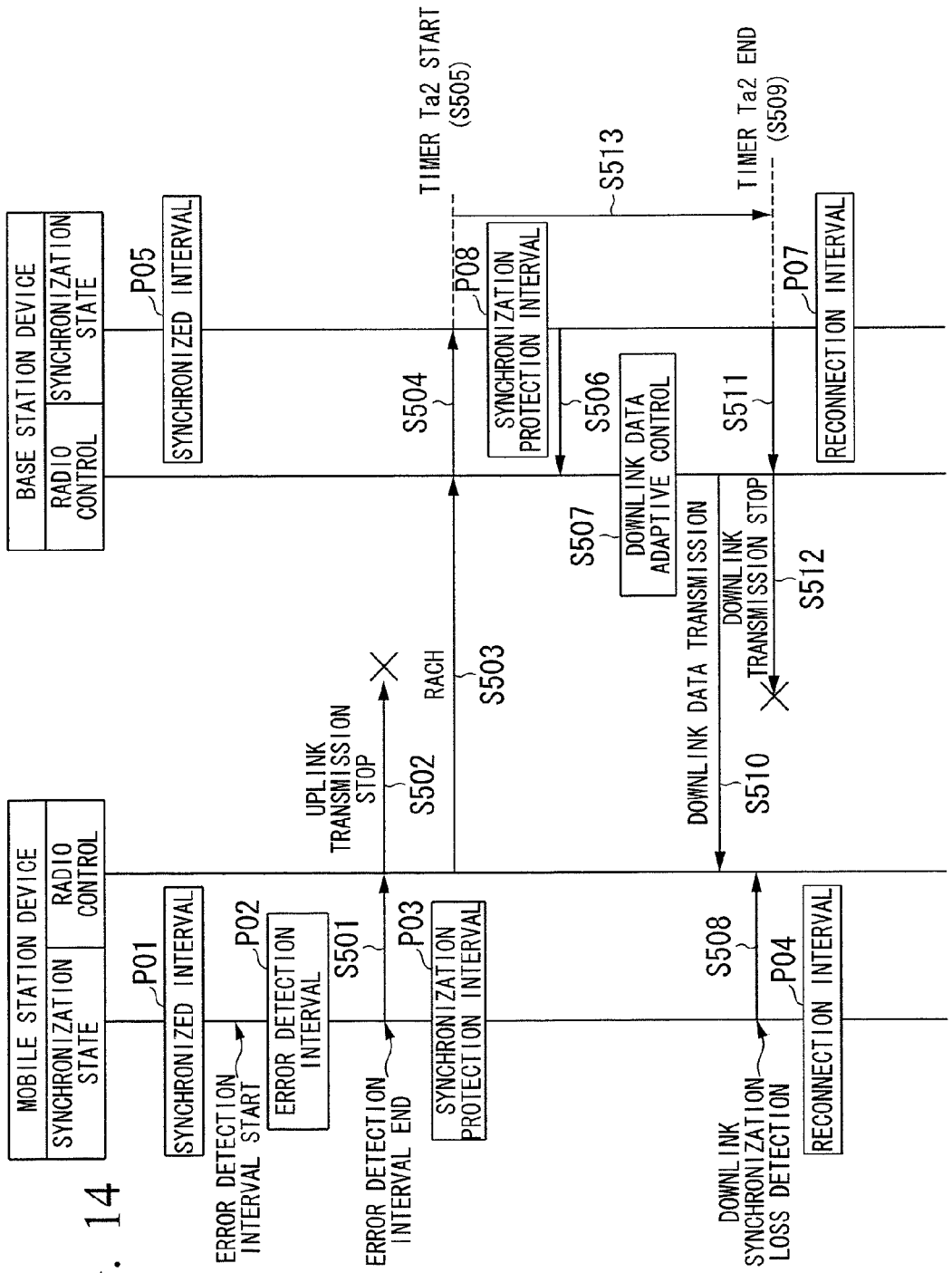
FIG. 14 is a sequence diagram that shows the processing of the mobile communication system in accordance with the second embodiment of the present invention.

FIG. 14 is a sequence diagram that shows the processing of the mobile communication system in accordance with the second embodiment of the present invention. FIG. 14 shows the transition of the downlink synchronization state of the mobile station device 10b and the base station device 30b during the occurrence of downlink synchronization loss and the related radio control processing. The processing of FIG. 14 starts from the state of the synchronized intervals P01 and P05 in which the mobile station device 10b and the base station device 30b are mutually communicating.

Thereafter, due to reasons such as downlink quality degradation, the downlink synchronization state of the mobile station device 10b side transitions from the synchronized interval P01 to the error detection interval P02. When the error detection interval P02 finishes as is and has transitioned to the synchronization protection interval P03, the transmission portion 26b of the mobile station device 10b, by the notification of the transition to the synchronization protection interval P03 (Step S501), performs uplink transmission stop control from the mobile station device 10b to the base station device 30b (Step S502) and places a CQI value and information that shows the downlink synchronization state is the synchronization protection interval P03 as a transmission purpose in the random access channel to notify the base station device 30b (Steps S503, S504). Note that even if information that shows that it is in the synchronization protection interval P03 is not set in the signal of the random access channel, if the downlink synchronization state of the mobile station device 10b is the synchronized interval P01, by receiving the signal of the random access channel that is not transmitted, the base station device 30b may determine that the mobile station device 10b is in the synchronization protection interval P03.

In the base station device 30b that has received the signal from the mobile station device 10b by the above-mentioned random access channel, simultaneously with the downlink synchronization state of the base station device 30b being transitioned from the synchronized interval P05 to the error protection interval P08, measurement of the time Ta2 (for example, 3 seconds) by the timer is started (Step S505). Also, adaptive control is performed on the downlink data transmitted from the base station device 30b to the mobile station device 10b (Steps S506, S507). Here, the time Ta2 that the timer times is determined based on the maximum transmission delay time of the signal transmitted by the random access channel.

The base station device 30b, in the case of being notified from the mobile station device 10 of the fact of it being in the synchronization protection interval P03 using the random access channel (Steps S503, S504), performs the following control based on the notified information. When the CQI value that is been notified by the signal of the random access channel is lower than the CQI value notified the previous time from the mobile station device 10b to the base station device 30b, recovering the downlink synchronization of the mobile station device 10b is facilitated by increasing the downlink quality by switching the modulation method of the signal that is transmitted from the base station device 30b to the mobile station device 10b to a modulation method with a higher error correction capability, increasing the downlink transmission power of the signal that is transmitted from the base station device 30b to the mobile station device 10b, or performing both.

In addition, a radio resource block with a good CQI value may be preferentially allocated to that mobile station device 10b in which the downlink synchronization error is occurring, or it is acceptable to switch to a transmission method that increases the frequency diversity effect by distributed arrangement of the radio transmission signal in a wide band. Also, it is acceptable to reduce the allocation of radio resources to the mobile station device 10b to improve the radio resource utilization efficiency. On the other hand, in the case that the CQI value that is simultaneously notified is almost the same as the CQI value notified from the mobile station device 10b the previous time or exceeds it, a downlink synchronization error due to temporary quality degradation is determined, and the usual radio resource allocation and scheduling are continued.

When the downlink synchronization of the mobile station device 10b does not recover even if the aforementioned adaptive control is performed and the synchronization protection interval P03 ends as is, the downlink synchronization state of the mobile station side 10b side transitions from the synchronization protection interval P03 to the reconnection interval P04, and the radio portion 26b of the mobile station device 10b, by being notified of detection of downlink synchronization loss (Step S508), starts cell reselection control.

When the measurement of the time Ta2 by the timer has expired (Step S509), the base station device 30b transitions the downlink synchronization state of the base station device 30b from the error protection interval F08 to the reconnection interval P07, releases the uplink radio resources that had been allocated to the mobile station device 10b, and allocates them to another mobile station device. Also, downlink transmissions that include the downlink data resending by HARQ (Step S520) are completely stopped (Steps S511, S512), and the radio resources thereof are allocated to another mobile station device.

While the timer is measuring time Ta2 (Step S513), when the signal of the uplink reference signal, the signal of a random access channel for uplink transmission timing adjustment, the uplink data transmission that had been scheduled, and uplink data such as a scheduling request from the mobile station device 10b is normally received, the downlink synchronization of the mobile station device 10b is regarded as recovered, the timing of the time Ta2 by the timer is stopped, and the downlink synchronization state of the base station device 30b is transitioned to the synchronized interval P05 to return to normal processing.

Figure 15:
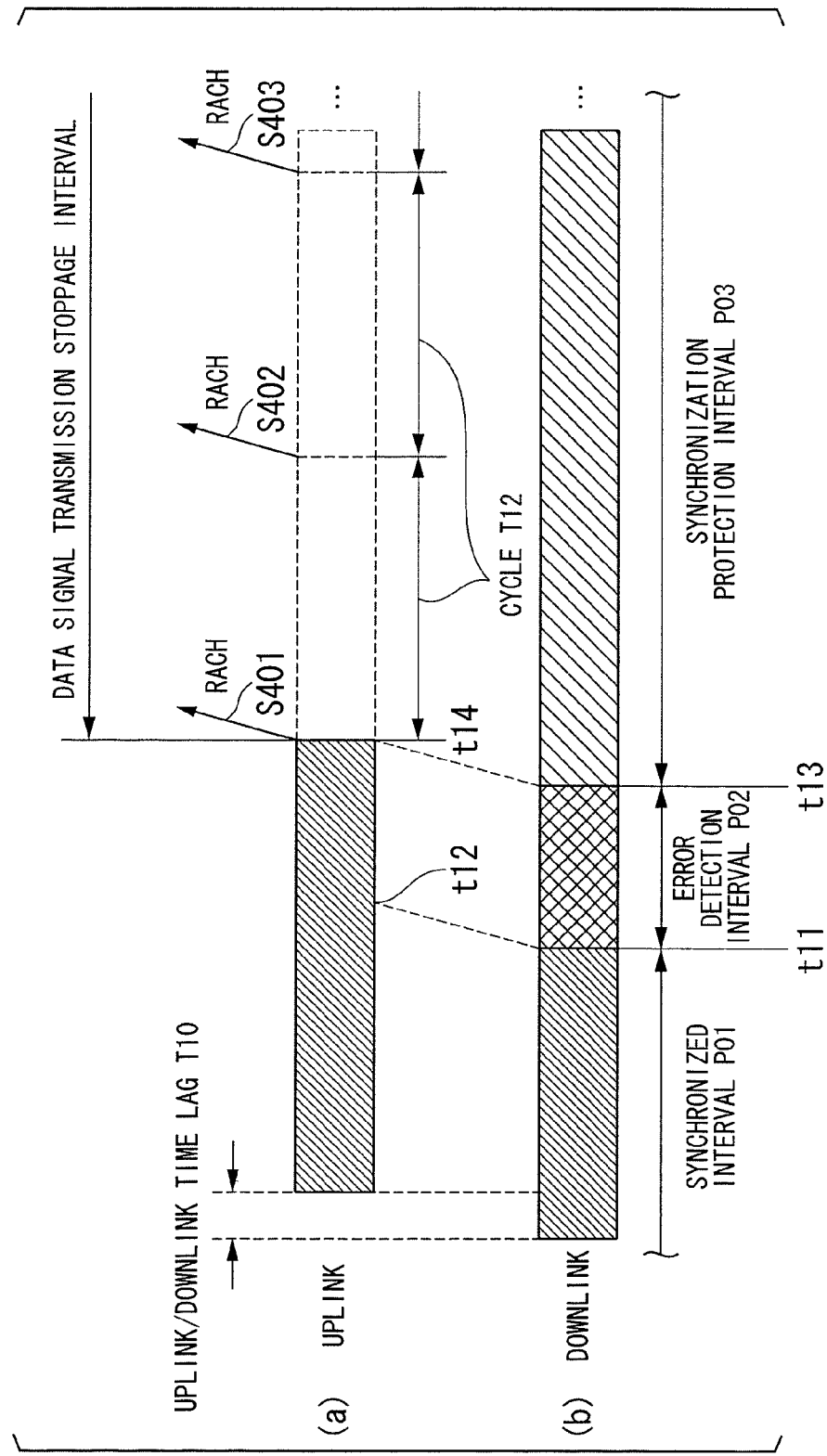
FIG. 15 is a figure for explaining another example of the process of transmission of the mobile station device 10b to the base station device 30b and the subsequent reception in the second embodiment.

FIG. 15 is a figure for explaining another example of processing of the transmission of the mobile station device 10b to the base station device 30b (FIG. 15 (a)) and the subsequent reception (FIG. 15 (b)) in the second embodiment. In FIG. 15, portions that are the same as in FIG. 8 shall be denoted by the same reference numerals, and descriptions thereof shall be omitted.

In FIG. 15, in the case of having transitioned from the error detection interval P02 to the synchronization protection interval P03 at time t13, after transmitting a signal from the mobile station device 10b to the base station device 30b by a random access channel at time t14 (Step S401), a signal is repeatedly transmitted by a random access channel in a fixed time interval T12 (for example, 10 milliseconds) (Steps S401, S402, S403, . . . ).

The mobile station device 10b, simultaneously with transitioning from the error detection interval P02 to the synchronization protection interval P03 at time t13, starts the timer that times the time T12 by the upper layer 20a. Then, when the downlink synchronization recovers or does not reach downlink synchronization loss by the time the measurement of the time T12 by the timer expires, a radio transmission signal that includes information about the transmission purpose to the base station device 30b and the CQI value is transmitted by the random access channel, and again the timing of the time T12 by the timer is started. The time T12 that the timer measures is notified to the mobile station device 10b in advance as a predetermined arbitrary value. The time T12 that the timer measures is set to be shorter than the time of the synchronization protection interval P03. By setting the time T12 that the timer measures to be the same time length as the uplink synchronization adjustment cycle, the possibility increases of being able to notify the CQI value from the mobile station device 10b to the base station device 30b prior to the uplink synchronization being lost.

In the second embodiment of the present invention, it is possible to notify the CQI value from the mobile station device 10b to the base station device 30b in a fixed frequency and continuously even after the downlink synchronization state of the mobile station device 10b has transitioned to the synchronization protection interval P03. Therefore, the mobile station device 10b can return to the usual scheduling immediately after synchronization recovery. Moreover, the base station device 30b can be switched to control in which synchronization is more easily recovered based on the CQI value that is notified from the mobile station device 10b at a fixed cycle.

The processing of FIG. 9 in the mobile station device 10a and the processing of FIG. 10 in the base station device 30a described in the first embodiment may be performed in the mobile station device 10b and the base station device 30b in accordance with the second embodiment.

In the second embodiment of the present invention, in the mobile station device 10b, the downlink synchronization error detection portion 27b detects a downlink synchronization error based on the signal transmitted from the base station device 30b, and in the case of the downlink synchronization error detection portion 27b having detected a downlink synchronization error a predetermined number of times (for example, five times) or a fixed time (for example, 10 milliseconds) having elapsed, information showing that the downlink synchronization state of the mobile station device 10b is in the synchronization protection interval is notified from the transmission portion 26b (also called a downlink synchronization error notification portion) to the base station device 30b.

Also, in the second embodiment of the present invention, in the base station device 30b, when information that shows that the downlink synchronization state is in the synchronization protection interval is notified from the transmission portion 26b of the mobile station device 10b, the channel modulation portion 42b or the transmission power control portion 43b (also called adaptive control portions) perform adaptive control on the signal transmitted to the mobile station device 10b, and the transmission portion 44b (also called a base station device transmission portion) transmits the signal on which the channel modulation portion 42b has performed adaptive control to the mobile station device 10b.

By performing the adaptive control so that a downlink synchronization error is easily recovered at the base station device 30b side according to the second embodiment of the present invention, even if a downlink synchronization error occurs at the mobile station device 10b, it is possible to promptly perform communication with the communication quality in a good state between the base station device 30b and the mobile station device 10b.

Also, when the downlink synchronization error detection portion 27b has detected a downlink synchronization error a predetermined number of times (for example, five times), or a fixed time (for example, 10 milliseconds) has elapsed, the transmission portion 26b of the mobile station device 10b sends information showing that the downlink synchronization state of the mobile station device 10b is in the synchronization protection interval to the base station device 30b, and so it is possible to reduce the number of times of notifying the occurrence of a downlink synchronization error from the mobile station device 10b to the base station device 30b, and possible to reduce the power consumption of the mobile station device 10b.

(Third Embodiment)

Next, a third embodiment of the present invention shall be described. The mobile communication system in accordance with the present embodiment is provided with a mobile station device 10c (refer to FIG. 16 mentioned below) and a base station device 30c (refer to FIG. 17 mentioned below).

In the third embodiment, by utilizing the fact that the downlink synchronization state and the uplink synchronization state of the mobile station device 10c can be independently controlled, it is possible to perform more accurate control on the control of the random access channel that is the uplink transmission channel based on the uplink synchronization state.

Figure 16:
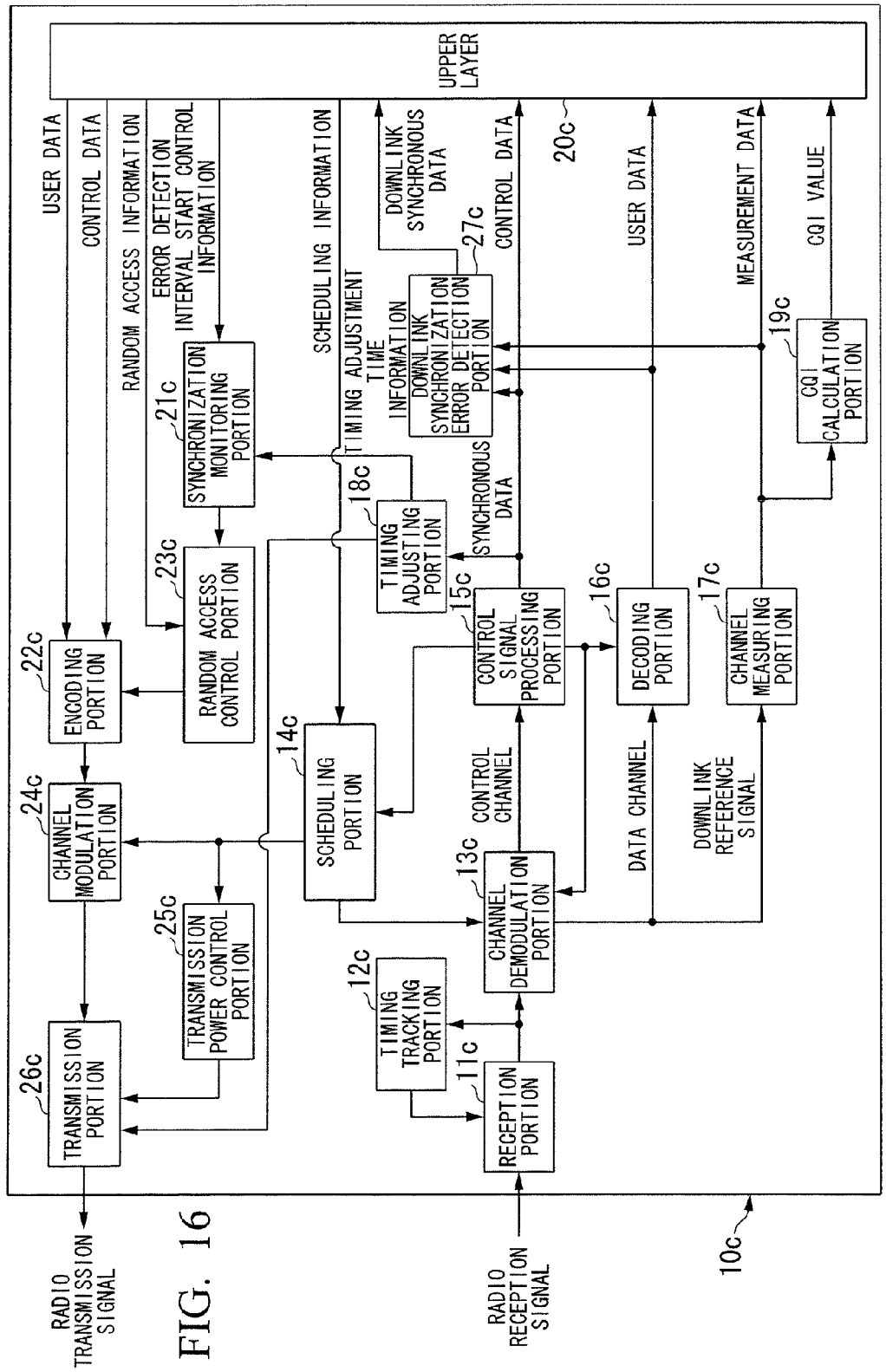
FIG. 16 is a block diagram that shows an example of the constitution of the mobile station device 10c in accordance with the third embodiment of the present invention.

FIG. 16 is a block diagram showing an example of the composition of the mobile station device 10c in accordance with the third embodiment of the present invention. This mobile station device 10c is provided with a reception portion 11c, a timing tracking portion 12c, a channel demodulation portion 13c, a scheduling portion 14c, a control signal processing portion 15c, a decoding portion 16c, a channel measuring portion 17c, a timing adjusting portion 18c, a CQI calculation portion 19c, an upper layer 20c, a synchronization monitoring portion 21c, an encoding portion 22c, a random access control portion 23c, a channel modulation portion 24c, a transmission power control portion 25c, a transmission portion 26c, and a downlink synchronization error detection portion 27c.

Since the parts 11c to 26c of the mobile station device 10c (FIG. 16) in accordance with the third embodiment have the same function as the parts 11a to 26a of the mobile station device 10a (FIG. 4) in accordance with the first embodiment, explanations thereof shall be omitted.

The third embodiment differs from the first embodiment on the point of timing adjustment time information being input from the timing adjusting portion 18c of the mobile station device 10c to the synchronization monitoring portion 21c.

Figure 17:
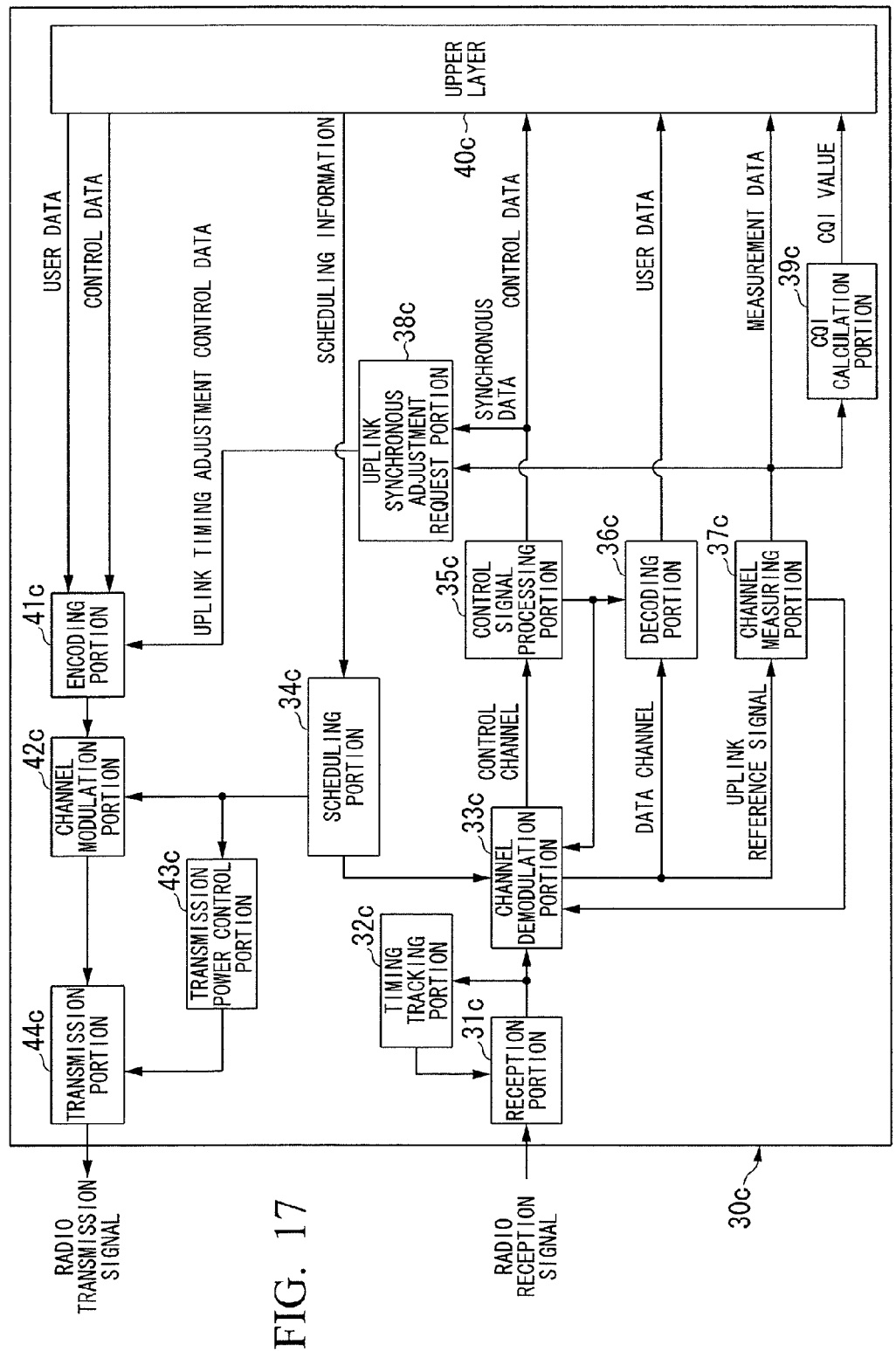
FIG. 17 is a block diagram that shows an example of the constitution of the base station device 30c in accordance with the third embodiment of the present invention.

FIG. 17 is a block diagram showing an example of the composition of the base station device 30c in accordance with the third embodiment of the present invention. This base station device 30c is provided with a reception portion 31c, a timing tracking portion 32c, a channel demodulation portion 33c, a scheduling portion 34c, a control signal processing portion 35c, a decoding portion 36c, a channel measuring portion 37c, an uplink synchronous adjustment request portion 38c, a CQI calculation portion 39c, an upper layer 40c, an encoding portion 41c, a channel modulation portion 42c, a transmission power control portion 43c, and a transmission portion 44c.

Since the parts 31c to 44c of the base station device 30c (FIG. 17) in accordance with the third embodiment have the same function as the part 31a to 44a of the base station device 30b (FIG. 5) in accordance with the first embodiment, explanations thereof shall be omitted.

Figure 18:
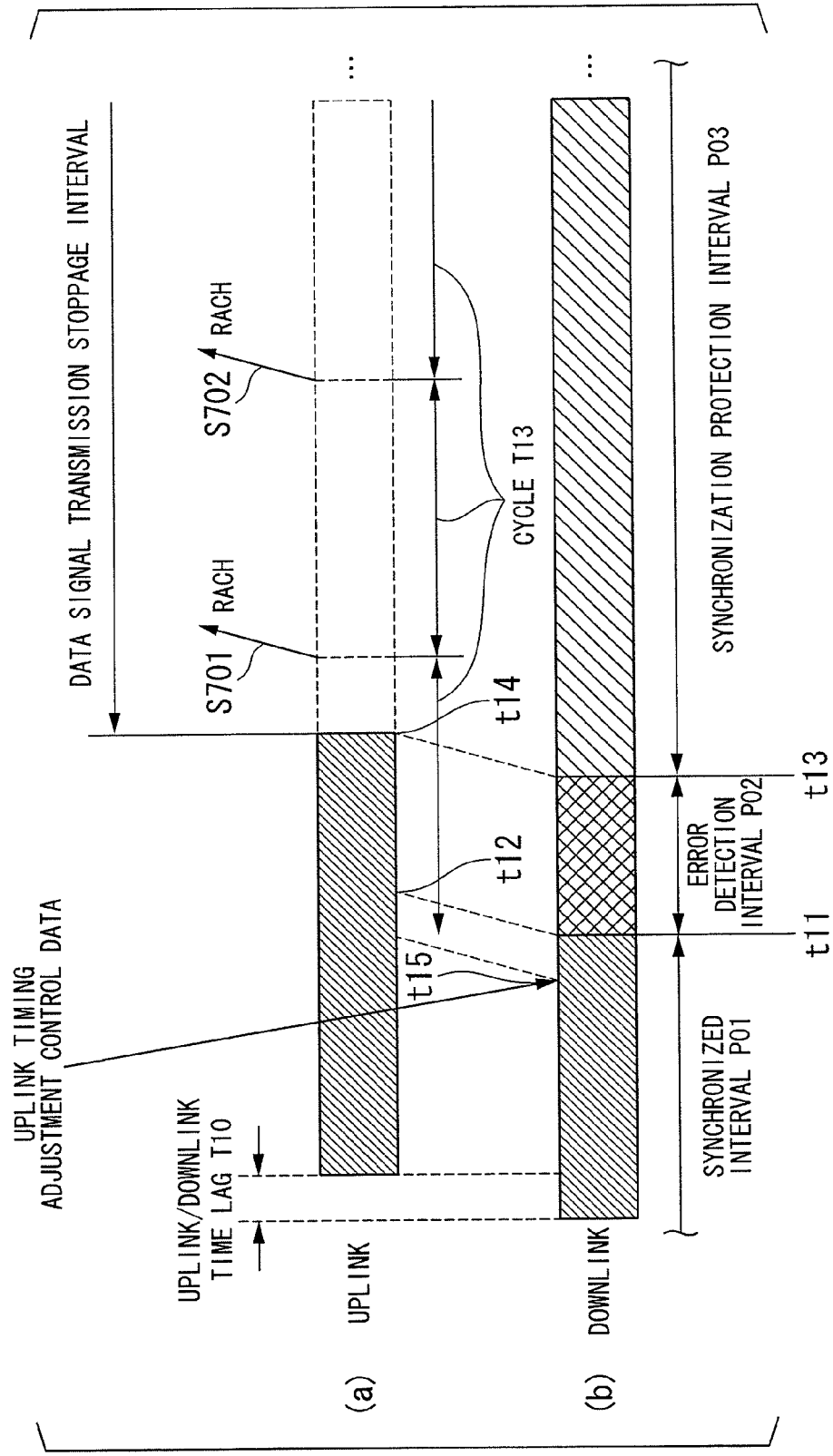
FIG. 18 is a figure for explaining the process of transmission of the mobile station device 10c to the base station device 30c and the subsequent reception in the third embodiment.

FIG. 18 (a) and FIG. 18 (b) are figures for explaining the process of transmission of the mobile station device 10c to the base station device 30c (FIG. 18 (a)), and subsequent reception (FIG. 18 (b)) in the third embodiment.

In the third embodiment, the timing of transmitting a radio transmission signal from the mobile station device 10c to the base station device 30c using a random access channel is repeatedly performed after the downlink synchronization state of the mobile station device 10c has transitioned to the error detection interval P02 (time t11 onward), and each time a predetermined time T13 (for example, 0.5 seconds) elapses from the point in time (time t15) at which the mobile station device 10c has received uplink timing adjustment control data from the base station device 30c (Steps S701, S702, ... ).

In the present embodiment, in the mobile station device 10c, during a interval in which the uplink synchronization state is highly likely to be in the synchronous state, since information that shows that the downlink synchronization state of the mobile station device 10c is the synchronization protection interval P03 is notified from the mobile station device 10c to the base station device 30c using a random access channel, without lowering the delivery probability of the radio transmission signal to the base station device 30c using the random access channel, it is possible to further reduce the number of times of transmission of a signal of a mobile station device by a random access channel, and possible to suppress power consumption of the mobile station device 10c.

When a cycle T13 has elapsed from the uplink timing adjustment control data last received from the base station device 30c, in the case of the downlink synchronization state having transitioned to the synchronization protection interval P03, the mobile station device 10c transmits a radio transmission signal to the base station device 30c at the uplink transmission timing of the signal by the most recent random access channel. At this time, the transmission purpose of the radio transmission signal and the CQI value are included in the radio transmission signal to be transmitted. Note that instead of the CQI value, there is also a method that notifies a bit that expresses whether the transmission quality if higher or lower than a predetermined threshold value.

The mobile station device 10c sets information that shows the occurrence of a downlink synchronization error as a transmission purpose of the signal by the random access channel, and notifies it to the base station device 30c. In the present embodiment, information that shows the occurrence of a downlink synchronization error means that the downlink synchronization state of the mobile station device 10c has transitioned from the error detection interval P02 to the synchronization protection interval P03.

The information of the transmission purpose of the signal by the random access channel (the information that shows that the downlink synchronization state is in the synchronization protection interval P03) may be directly notified from the mobile station device 10e to the base station device 30c as a radio transmission signal, and may be indirectly notified utilizing the preamble number and series of the random access channel, the transmission frequency region, and the like. Or, a specific CQI value may be set in advance between the mobile station device 10c and the base station device 30c as one showing that the downlink synchronization state is the synchronization protection interval P03.

The correlation of the transmission purpose of the signal by a random access channel and the information that shows that the downlink synchronization state is the synchronization protection interval P03 may be uniquely set in a mobile communication system, may be informed from the base station device 30c to the mobile station device 10c by the broadcast information channel, and may also be individually notified to each mobile station device 10c. As mentioned above, an asynchronous random access channel and a synchronous random access channel exist in a random access channel, either may be used. In addition, it is possible to use any downlink channel for the detection method of the downlink synchronization error in the mobile station device 10c. As this detection method, it is possible to use a method that measures at least one of the qualities of the downlink channel (the aforementioned SIR, SINR, SNR, path loss, bit error rate, and the like) for a given time, and compares it with a threshold value that is set in advance in the mobile transmission system or a threshold value that is notified from the base station device 30c to the mobile station device 10c prior to the start of measurement.

After the mobile station device 10c transmits a radio transmission signal to the base station device 30c by the random access channel, in the event of the downlink synchronization state again being the synchronization protection interval P03 when the time T13 has again elapsed, it again transmits a radio transmission signal to the base station device 30c by the random access channel. Thereafter, the mobile station device 10c repeats the same control until the downlink synchronization state transitions to the reconnection interval. Also, when the downlink synchronization state has transitioned to the reconnection interval, the mobile station device 10c stops transmission of the uplink data channel that had been scheduled to the base station device 30c in the subsequent data signal transmission stoppage interval and performs the process of reconnection of downlink synchronization.

Figure 19:
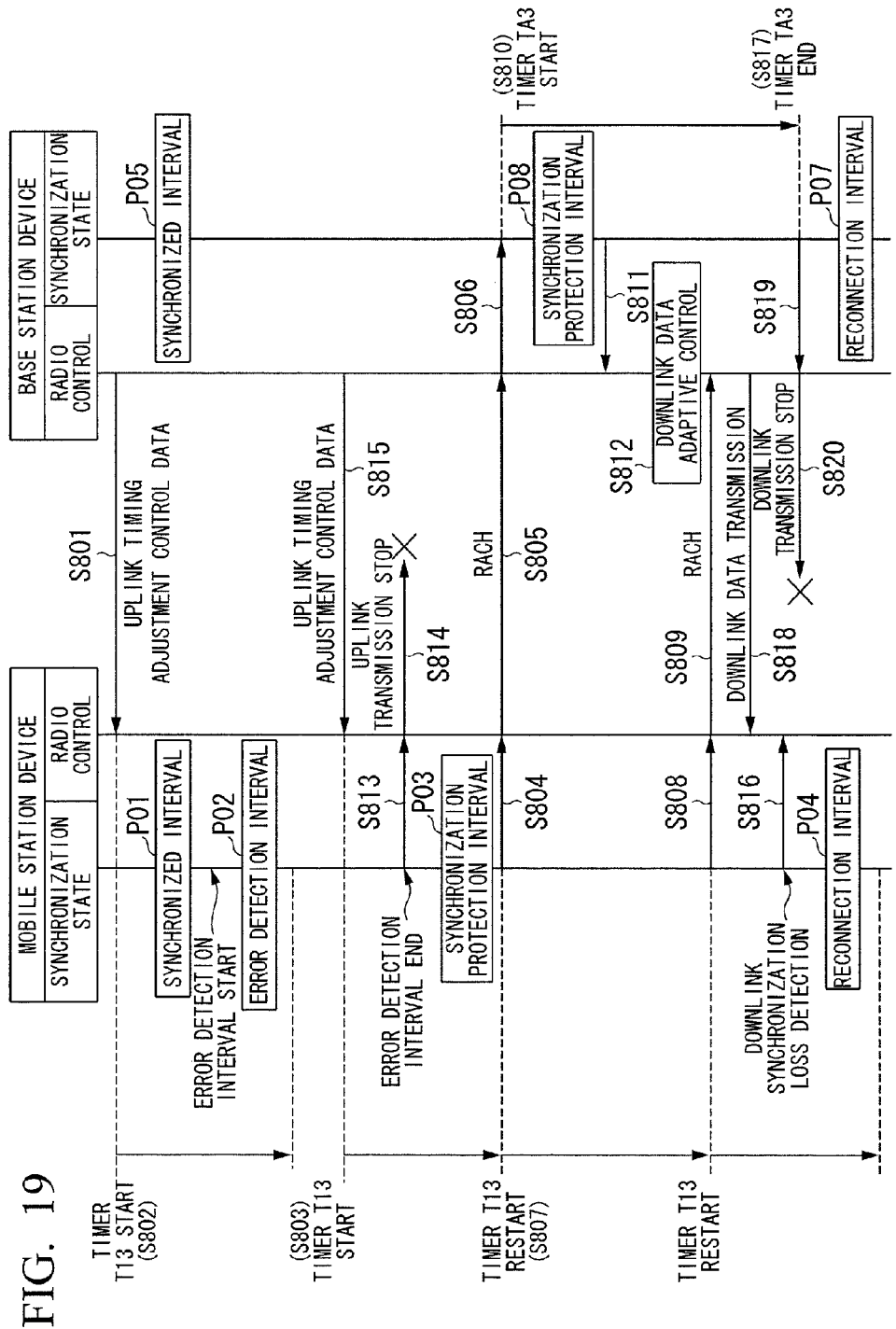
FIG. 19 is a sequence diagram that shows the processing of the mobile communication system in accordance with the third embodiment of the present invention.
Figure 20:
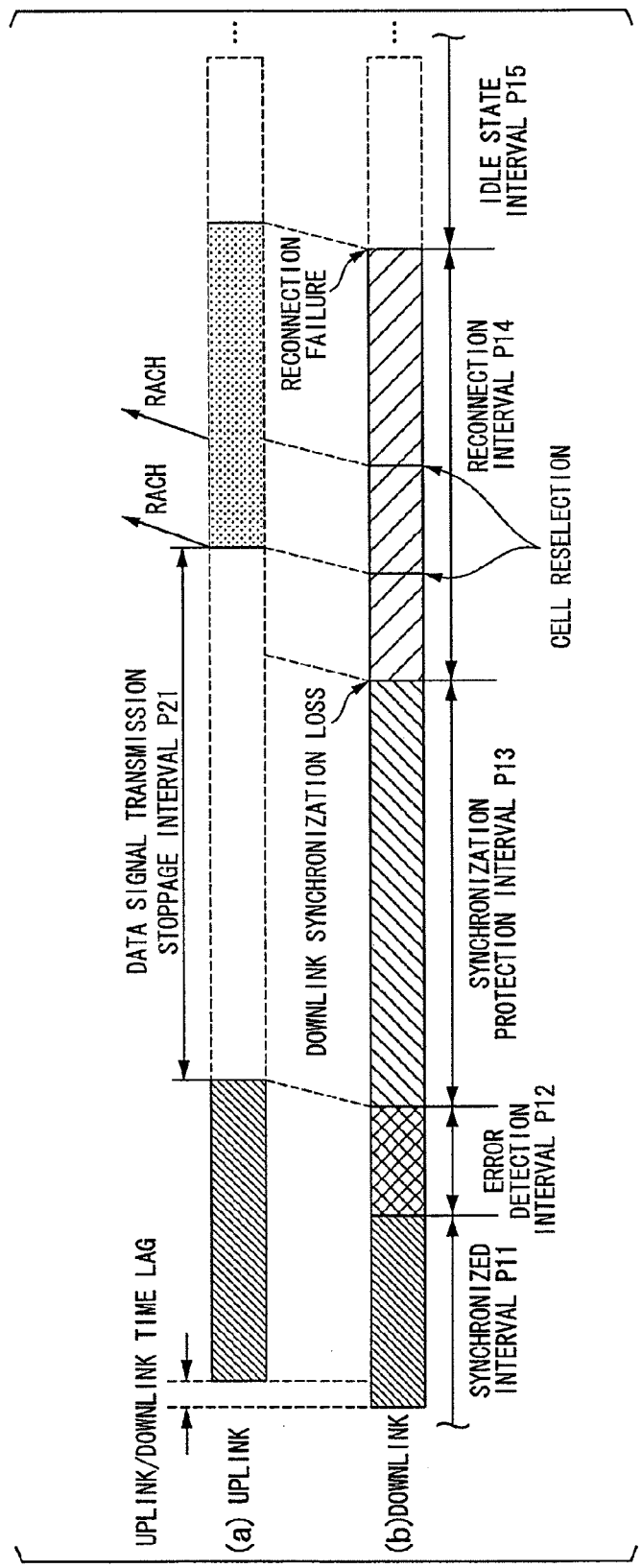
FIG. 20 is a figure for explaining the process of transmission of a mobile station device to a base station device and the subsequent reception in the prior art.
Figure 21:
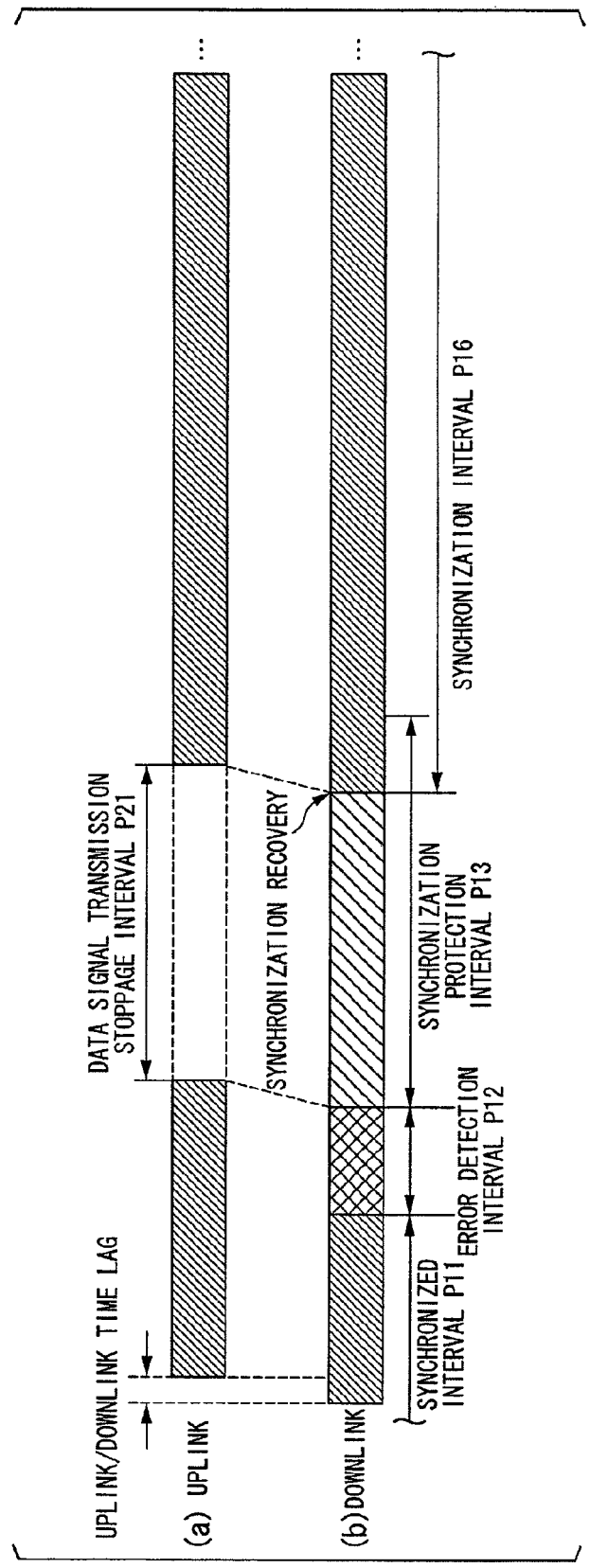
FIG. 21 is a figure for explaining the process of transmission of a mobile station device to a base station device and the subsequent reception in the prior art.
Figure 22:
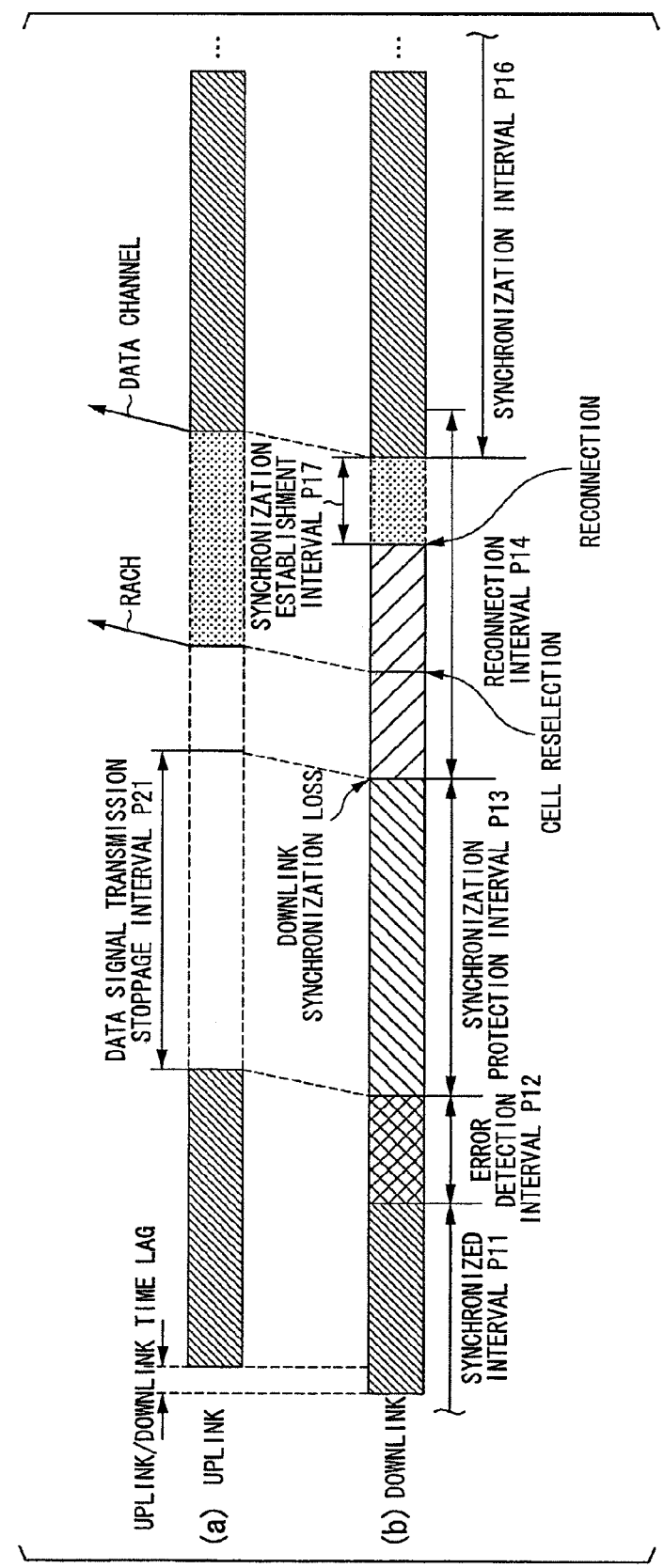
FIG. 22 is a figure for explaining the process of transmission of a mobile station device to a base station device and the subsequent reception in the prior art.
Figure 23:
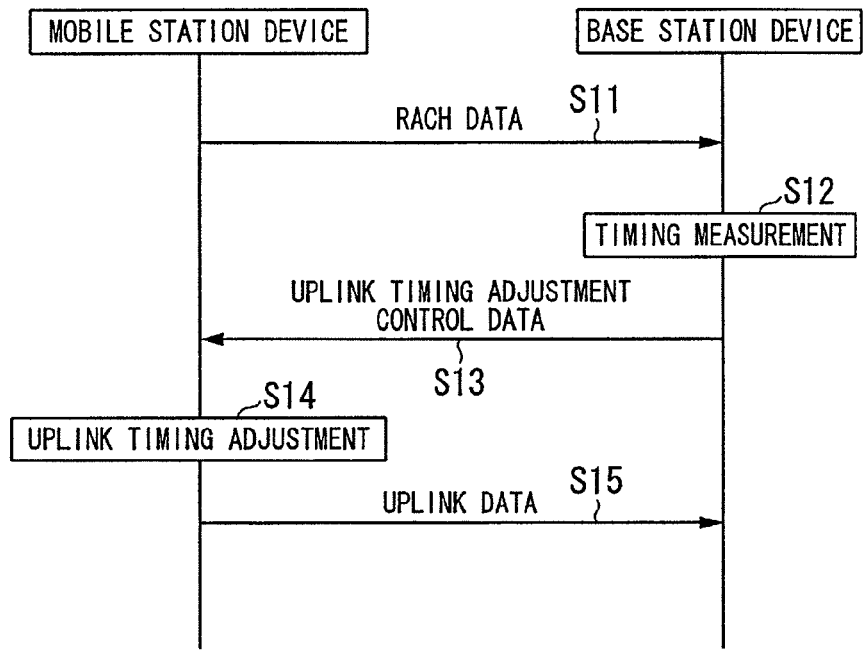
FIG. 23 is a sequence diagram that shows the processing of the mobile communication system in the prior art.
Figure 24:
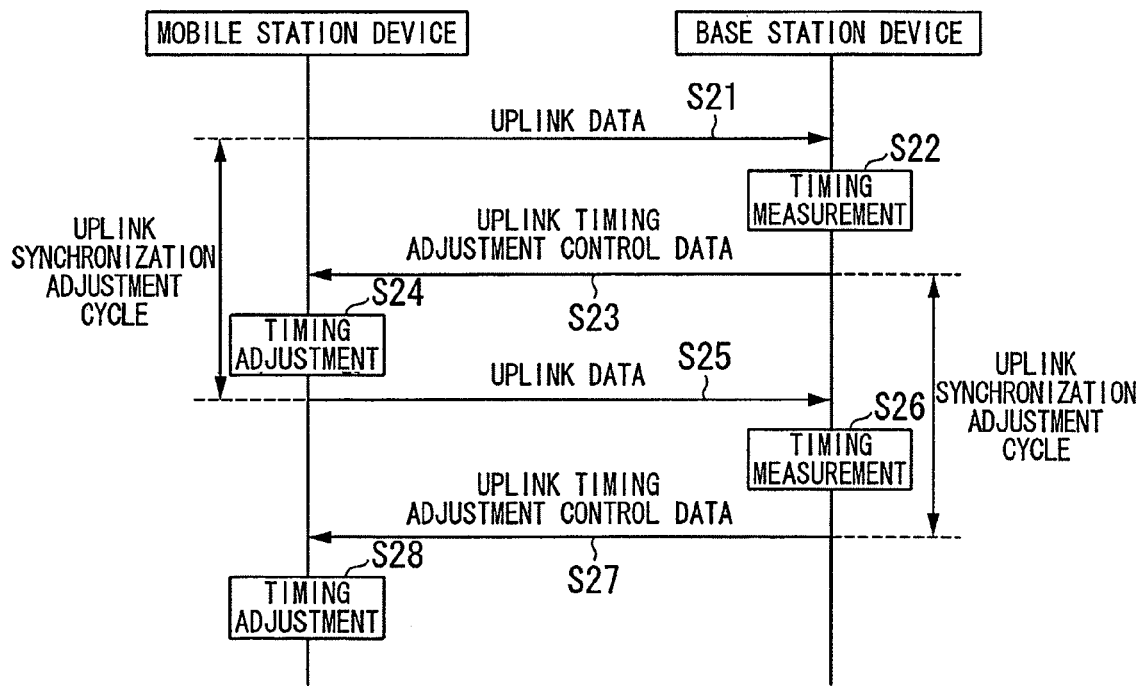
FIG. 24 is a sequence diagram that shows the processing of the mobile communication system in the prior art.
Figure 25:
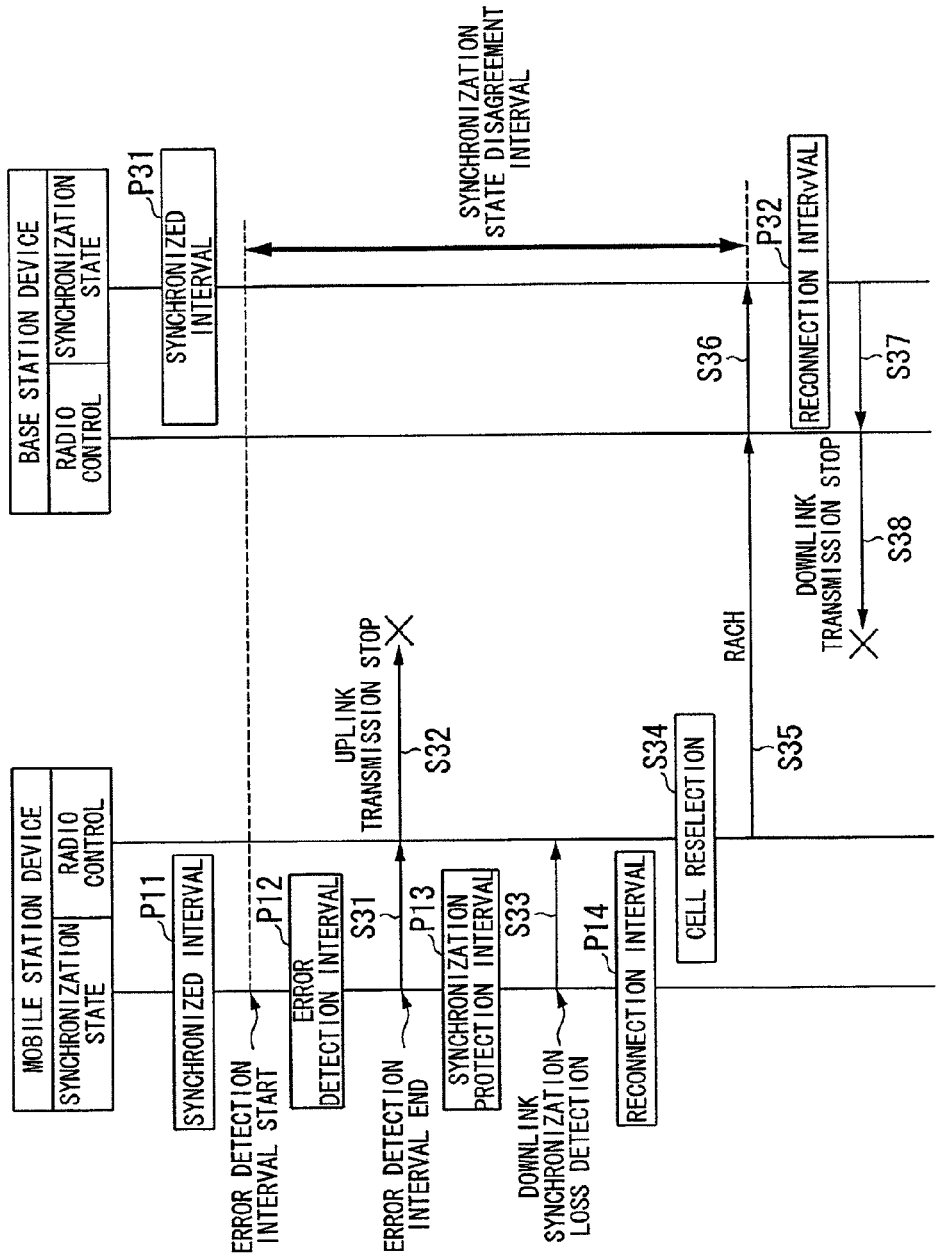
FIG. 25 is a sequence that shows the processing of the mobile communication system in the prior art.

FIG. 19 is a sequence diagram that shows the processing of the mobile communication system in accordance with the third embodiment of the present invention. FIG. 19 shows the transition of the downlink synchronization state of the mobile station device 10c and the base station device 30c during the occurrence of downlink synchronization loss and the related radio control processing. The sequence diagram of FIG. 19 starts from the state of the synchronized intervals P01 and P05 in which the mobile station device 10c and the base station device 30c are mutually communicating. When the mobile station device 10c has received uplink timing adjustment control data from the base station device 30c (Steps S801 and S815), timing of the time T13 by the timer is started (Step S802). When the timing of the time T13 by the timer is completed (Step S803), if the downlink synchronization state of the mobile station device 10c has not transitioned to the synchronization protection interval P03 it does nothing. Thereafter, due to reasons such as downlink quality degradation, the downlink synchronization state of the mobile station device 10b side transitions from the synchronized interval P01 to the error detection interval P02, and furthermore when the error detection interval P02 finishes as is and has transitioned to the synchronization protection interval P03, the transmission portion 26c of the mobile station device 10c, by the notification of the transition to the synchronization protection interval P03 (Step S813), performs uplink transmission stop control from the mobile station device 10c to the base station device 30c (Step S814). When the downlink synchronization state of the mobile station device 10c when the timing of the time T13 by the timer has expired is the synchronization protection interval P03, the transmission portion 26c of the mobile station device 10c places a CQI value and information that shows the downlink synchronization state is the synchronization protection interval P03 as a transmission purpose in the random access channel to notify the base station device 30c (Steps S804, S805, S806).

Note that even if information that shows that it is the synchronization protection interval P03 is not set in the signal of the random access channel, if the downlink synchronization state of the mobile station device 10c is the synchronized interval P01, by receiving the signal of the random access channel that is not transmitted, the base station device 30c may determine that the mobile station device 10c has transitioned to the synchronization protection interval P03.

Also, simultaneously with the transmission of a signal by a random access channel, measurement of the time T13 by the timer is again started (Step S807), and if the downlink synchronization state of the mobile station device 10c when the measurement of the time T13 by the timer has expired is the synchronization protection interval P03, once again it sends a signal using a random access channel (Step S808, S809). When the synchronization interval has transitioned from the synchronization protection interval P03 to the reconnection interval P04, it does nothing.

Among the signals transmitted by the random access channel, in the base station device 30c that first received the signal transmitted by the random access channel, simultaneously with the downlink synchronization state of the base station device 30c being transitioned from the synchronized interval P05 to the error protection interval P08, measurement of the time Ta3 (for example, 3 seconds) by the timer is started (Step S810). Also, adaptive control is performed on the downlink data transmitted from the base station device 30c to the mobile station device 10c (Steps S811, S812). Note that the time Ta3 that the timer times is determined based on the maximum transmission delay time of the signal transmitted by the random access channel or the time T13.

The base station device 30c, in the case of being notified from the mobile station device 10c by a random access channel of the fact that the mobile station device 10c is in the synchronization protection interval P03 (Steps S503, S504), performs the following control based on the notified information. That is, when the CQI value that is been notified by the signal of the random access channel is lower than the CQI value notified the previous time from the mobile station device 10c, recovering the downlink synchronization of the mobile station device 10c is facilitated by increasing the downlink quality by switching the modulation method of the signal that is transmitted from the base station device 30c to the mobile station device 10c to a modulation method with a higher error correction capability, increasing the downlink transmission power of the signal that is transmitted from the base station device 30c to the mobile station device 10c, or performing both.

In addition, a radio resource block with a good CQI value may be preferentially allocated to the mobile station device 10c, or it is acceptable to switch to a transmission method that increases the frequency diversity effect by distributed arrangement of the radio transmission signal in a wide band. Also, it is acceptable to reduce the allocation of radio resources to the mobile station device 10c to improve the radio resource utilization efficiency. On the other hand, in the case that the CQI value that is simultaneously notified is almost the same as the CQI value notified from the mobile station device 10c the previous time or exceeds it, a downlink synchronization error due to temporary quality degradation is determined, and the usual radio resource allocation and scheduling are continued. The base station device 30c furthermore is capable of using the information subsequently received by the random access channel.

When the downlink synchronization of the mobile station device 10c does not recover even if the aforementioned adaptive control is performed and the synchronization protection interval P03 ends as is, the downlink synchronization state of the mobile station 10c side transitions from the synchronization protection interval P03 to the reconnection interval P04, and the radio portion 26c of the mobile station device 10c, by being notified of detection of downlink synchronization loss (Step S816), starts cell reselection control.

When the measurement of the time Ta3 by the timer has expired (Step S817), the base station device 30c transitions the downlink synchronization state of the base station device 30c from the error protection interval P08 to the reconnection interval P07, releases the uplink radio resources that had been allocated to the mobile station device 10c, and allocates them to another mobile station device. Also, downlink transmissions that include the downlink data resending by HARQ (Step S818) are completely stopped (Steps S819, S820), and the radio resources thereof are allocated to another mobile station device.

While the timer is measuring time Ta3, when the signal of the uplink reference signal, the signal of a random access channel for uplink transmission timing adjustment, the uplink data transmission that had been scheduled, and uplink data such as a scheduling request from the mobile station device 10c is normally received, the downlink synchronization of the mobile station device 10c is regarded as recovered, the timing of the time Ta3 by the timer is stopped, and the downlink synchronization state of the base station device 30c is transitioned to the synchronized interval P05 to return to normal processing.

In the third embodiment of the present invention, in the mobile station device 10c, the downlink synchronization error detection portion 21c detects a downlink synchronization error based on the signal transmitted from the base station device 30c, and after the downlink synchronization error detection portion 21c has detected a downlink synchronization error and received uplink timing adjustment control data from the base station device 30c, the transmission portion 26c (the downlink synchronization error notification portion) notifies the base station device 30c of the occurrence of a downlink synchronization error.

Also, in the third embodiment of the present invention, in the base station device 30c, when the occurrence of a downlink synchronization error is notified from the transmission portion 26c of the mobile station device 10c, the channel modulation portion 42c or the transmission power control portion 43c (also called adaptive control portions) perform adaptive control on the signal transmitted to the mobile station device 10c, and the transmission portion 44c (also called a base station device transmission portion) transmits the signal on which the channel modulation portion 42c has performed adaptive control to the mobile station device 10c.

By performing the adaptive control so that a downlink synchronization error is easily recovered at the base station device 30c side according to the third embodiment of the present invention, even if a downlink synchronization error occurs at the mobile station device 10c, after receiving uplink timing adjustment control data from the base station device 30c, it is possible to promptly perform communication with the communication quality in a good state between the base station device 30c and the mobile station device 10c.

In the transmission portion 26c of the mobile station device 10c, during a interval in which the uplink synchronization state is highly likely to be in the synchronous state, since information that shows that the downlink synchronization state of the mobile station device 10c is the synchronization protection interval P03 is notified to the base station device 30c using a random access channel, it is possible to further reduce the number of times of transmission of a signal of a mobile station device by a random access channel, and possible to reduce power consumption of the mobile station device 10c.

According to the aforementioned first through third embodiments, even if the downlink synchronization state of the mobile station device becomes downlink synchronization lost, since it is possible to promptly report the downlink synchronization state of the mobile station device to the base station device, it is possible to increase the possibility of recovery from downlink synchronization loss by adaptive control, and the communication quality improves. Also, since the base station device is capable of grasping the downlink synchronization state of the mobile station device, performing wasteful resource allocation can be eliminated, and radio resource utilization efficiency can be raised.

In the embodiments described above, control of the mobile station device and the base station device may be performed by recording on a computer-readable recording medium a program for realizing the functions of each portion of the mobile station device 10a (FIG. 4) and the base station device 30a (FIG. 5) according to the first embodiment, each portion of the mobile station device 10b (FIG. 11) and the base station device 30b (FIG. 12) according to the second embodiment, and each portion of the mobile station device 10c (FIG. 16) and the base station device 30c (FIG. 17) according to the third embodiment or a portion of these functions, reading the program that is recorded on this recording medium into a computer system, and executing it. Note that "computer system" here refers to one that includes an operating system as well as hardware such as peripheral devices.

Also, a "computer-readable recording medium" refers to a portable medium such as a flexible disk, magneto-optical disk, ROM, CD-ROM and the like, and a storage device such as a hard disk that is housed in a computer system. The "computer readable storage medium" also includes one for holding the program for a certain time, such as a volatile memory in a computer system which functions as a server or client for receiving the program sent via a network (e.g., the Internet) or a communication line (e.g., a telephone line). Also, the program may be one for realizing a portion of the abovementioned functions, and it is also possible to realize the abovementioned functions in combination with a program that has already been stored in the computer system.

While preferred embodiments of the invention have been described and illustrated above, specific constitutions are not limited to these embodiments, and designs are also included with a scope that do not depart from the spirit or scope of the present invention.

Industrial Applicability

The present invention can be applied to a mobile communication system, a mobile station device, a base station device, and a mobile communication method that are capable of promptly performing communication with the communication quality in a good state between the base station device and the mobile station device, even if a downlink synchronization error occurs at the mobile station device.

The invention claimed is:

1. A mobile communication system provided with a mobile station device and a base station device, the mobile communication system comprising:

the mobile station device comprising:

a downlink synchronization error detecting portion configured to detect an occurrence of a downlink synchronization error from a measurement result of a transmission signal received from the base station device;

a synchronization monitoring portion configured to generate a random access channel based on both a downlink synchronization state and an uplink synchronization state of the mobile station device, the downlink synchronization state transits based on information regarding the detection of the downlink synchronization error and a timer, and, the uplink synchronization state transits based on received information regarding an uplink timing adjustment, the generated random access channel including information regarding the detected downlink synchronization error in a case that a time regarding the uplink timing adjustment is elapsed; and a downlink synchronization error notifying portion configured to transmit a notification of the detected occurrence of the downlink synchronization error, using the random access channel, to the base station device, and the base station device comprising:

an adaptive control portion configured to receive the random access channel from the mobile station device and perform scheduling based on the occurrence of the downlink synchronization error.

2. A mobile communication system provided with a mobile station device and a base station device, the mobile communication system comprising:
the mobile station device comprising:
a downlink synchronization error detecting portion configured to detect an occurrence of a downlink synchronization error from a measurement result of a transmission signal received from the base station device;
a synchronization monitoring portion configured to set information showing the occurrence of the downlink synchronization error into a random access channel based on both a downlink synchronization state and an uplink synchronization state of the mobile station device, the downlink synchronization state transits based on information regarding the detection of synchronization error and a timer, the uplink synchronization state transits based on received information regarding an uplink timing adjustment; and
a downlink synchronization error notifying portion configured to transmit a notification of the detected occurrence of the downlink synchronization error, using the random access channel to the base station device in a case that a time regarding the uplink timing adjustment is elapsed, and
the base station device comprising:
an adaptive control portion configured to receive the random access channel from the mobile station device, execute acquisition processing of control information that is set into the random access channel and that shows the occurrence of the downlink synchronization error, and perform scheduling based on the information that shows the occurrence of the downlink synchronization error.

3. The mobile communication system according to claim 2, wherein
the mobile station device is configured to set the information showing the occurrence of the downlink synchronization error with respect to the base station device into the random access channel in case that the downlink synchronization state of the mobile station device is a state in which the occurrence of a downlink synchronization error has been detected at least once.

4. The mobile communication system according to claim 2, wherein
the mobile station device is configured to set the information showing the occurrence of the downlink synchronization error with respect to the base station device into the random access channel in case that the downlink synchronization state of the mobile station device is a state in which the occurrence of a downlink synchronization error has been detected a predetermined number of times or continuously for a predetermined time.

5. The mobile communication system according to claim 2, wherein
the mobile station device is configured to set the information that shows the occurrence of a downlink synchronization error with respect to the base station device into the random access channel in case that the uplink synchronization state of the mobile station device is a state within a predetermined time after receiving uplink timing adjustment control data that shows the uplink transmission timing, and furthermore the downlink synchronization state of the mobile station device is a state in which a downlink synchronization error has been detected at least once.

6. The mobile communication system according to claim 2, wherein
the mobile station device, after notifying the base station device of the occurrence of a downlink synchronization error, is configured to repeatedly transmit the occurrence of the downlink synchronization error using the random access channel to the base station device each time a predetermined time has elapsed.

7. The mobile communication system according to claim 2, wherein
the base station device is configured to start a timer that measures a time until downlink synchronization loss simultaneously with being notified of the occurrence of the downlink synchronization error from the mobile station device, and during a period until the timer expires or until the downlink synchronization error recovers, perform scheduling to use a modulation method with a higher error correction capability than prior to notification of the downlink synchronization error on a transmission signal to the mobile station device, or increase the transmission power.

8. The mobile communication system according to claim 2, wherein
the base station device is configured to start a timer that measures a time until downlink synchronization loss simultaneously with being notified of the downlink synchronization error by the mobile station device, and based on an occurrence that the timer has expired, the base station device is configured to perform scheduling to stop subsequent transmission to the mobile station device.

9. A mobile communication method that uses a mobile station device and a base station device, the mobile communication method comprising:
in the mobile station device:
detecting an occurrence of a downlink synchronization error from a measurement result of a transmission signal received from the base station device;
setting information showing the occurrence of the downlink synchronization error into a random access channel based on both a downlink synchronization state and an uplink synchronization state of the mobile station device, the downlink synchronization state transits based on information regarding the detection of synchronization error and a timer, the uplink synchronization state transits based on received information regarding an uplink timing adjustment; and
transmitting a notification of the detected occurrence of the downlink synchronization error in a case that a time regarding the uplink timing adjustment is elapsed, using the random access channel to the base station device, and in the base station device:
receiving the random access channel from the mobile station device,
executing acquisition processing of control information that is set into the random access channel and that shows the occurrence of the downlink synchronization error, and
performing scheduling based on the information that shows the occurrence of the downlink synchronization error.

10. The mobile communication method according to claim 9, wherein
the setting of the information showing the occurrence of the downlink synchronization error with respect to the base station device into the random access channel is performed in response to determining that the downlink synchronization state of the mobile station device is a state in which the occurrence of the downlink synchronization error has been detected at least once.

11. The mobile communication method according to claim 9, wherein
the setting of the information showing the occurrence of the downlink synchronization error with respect to the base station device into the random access channel is performed in response to determining that the downlink synchronization state of the mobile station device is a state in which the occurrence of the downlink synchronization error has been detected a predetermined number of times or continuously for a predetermined time.

12. The mobile communication method according to claim 9, wherein
the setting of the information that shows the occurrence of the downlink synchronization error with respect to the base station device into the random access channel is performed in response to determining that the uplink synchronization state of the mobile station device is a state within a predetermined time after receiving uplink timing adjustment control data that shows the uplink transmission timing, and further determining that the downlink synchronization state of the mobile station device is a state in which a downlink synchronization error has been detected at least once.

13. The mobile communication method according to claim 9, wherein
after notifying the base station device of the occurrence of the downlink synchronization error, repeatedly transmitting, from the mobile station device, the occurrence of the downlink synchronization error using the random access channel to the base station device each time a predetermined time has elapsed.

14. The mobile communication method according to claim 9, further comprising, in the base station:
starting a timer that measures a time until downlink synchronization loss simultaneously with being notified of the occurrence of the downlink synchronization error from the mobile station device, and during a period until the timer expires or until the downlink synchronization error recovers, performing scheduling to use a modulation method with a higher error correction capability than prior to notification of the downlink synchronization error on a transmission signal to the mobile station device, or increase the transmission power.

15. The mobile communication method according to claim 9, further comprising, in the base station:
starting a timer that measures a time until downlink synchronization loss simultaneously with being notified of the occurrence of the downlink synchronization error by the mobile station device, and based on an occurrence that the timer has expired, performing scheduling to stop subsequent transmission to the mobile station device.

* * * * *